US012620248B1

(12) United States Patent     (10) Patent No.:   US 12,620,248 B1

Halder et al.        (45) **Date of Patent:   \*May 5, 2026**

(54) TRAINING-FREE FRAMEWORK FOR ZERO-SHOT CHECK FIELD DETECTION

(71) Applicant: U.S. Bank National Association, Minneapolis, MN (US)

(72) Inventors: Sourav Halder, Chicago, IL (US); Jinjun Tong, Corona, CA (US); Xinyu Wu, Buffalo Grove, IL (US)

(73) Assignee: U.S. Bank National Association

( * ) Notice: Subject to any disclaimer, the term of this patent is extended or adjusted under 35 U.S.C. 154(b) by 0 days.

This patent is subject to a terminal disclaimer.

(21) Appl. No.: 19/382,978

(22) Filed: Nov. 7, 2025

Related U.S. Application Data

(63) Continuation of application No. 19/270,987, filed on Jul. 16, 2025, now Pat. No. 12,488,609.

(51) Int. Cl.
     G06V 30/224      (2022.01)
     G06V 30/414      (2022.01)
(52) U.S. Cl.
     CPC ........ G06V 30/2253 (2022.01); G06V 30/414 (2022.01)
(58) Field of Classification Search
     CPC ......................... G06V 30/2253; G06V 30/414
     See application file for complete search history.

(56) References Cited

U.S. PATENT DOCUMENTS

| | | | | |
|---|---|---|---|---|
| 11,909,934 | B1 * | 2/2024 | Rasheed .............. | G06V 10/267 |
| 2021/0319270 | A1 * | 10/2021 | Qu ........................ | G06F 18/251 |
| 2024/0037971 | A1 * | 2/2024 | Abraham ................ | G06F 40/30 |
| 2024/0070868 | A1 * | 2/2024 | Yu ........................ | G06V 10/273 |
| 2024/0144204 | A1 * | 5/2024 | Kolavennu .......... | G06Q 20/042 |
| 2025/0103798 | A1 * | 3/2025 | Dixit .................... | G06V 30/412 |
| 2025/0148757 | A1 * | 5/2025 | Su .......................... | G06V 20/56 |
| 2025/0200213 | A1 * | 6/2025 | Sheik-Nainar .......... | G06F 21/32 |
| 2025/0371866 | A1 * | 12/2025 | Xu ........................ | G06V 10/454 |

OTHER PUBLICATIONS

Saini et al, ("Advancing Open-Set Object Detection in Remote Sensing Using Multimodal Large Language Model", 2025 IEEE/ CVF Winter Conference on Applications of Computer Vision Workshops (WACVW)) (Year: 2025).*

(Continued)

*Primary Examiner* — Amara Abdi
(74) *Attorney, Agent, or Firm* — Garg Law Firm, PLLC; Rakesh Garg; Chris Ziolkowski

(57)          ABSTRACT

A first Vision-Language Model (VLM) in a first branch identifies a first set of fields in input data using a visualized first set of bounding boxes (BB). The first VLM labels and outputs a labeled first set of fields. A first agentic AI in the first branch localizes and outputs an identified field as a desired type of field using a visualized identified BB. A second VLM in a second branch identifies a second set of fields in the input data using a visualized second set of BBs. An MLLM uses the input data with the second set of BBs to output a set of recognizing field from the second set of BBs. A second agentic AI in the second branch and labels a target field. A training data set is formed by combining the input data, labeled identified field, and the labeled target field.

20 Claims, 11 Drawing Sheets

(56) References Cited

OTHER PUBLICATIONS

Gorski et al, ("Industrial bank check processing: the A2iA CheckReader™", I.JDAR (2001) 3: 196-206) (Year: 2001).*

Zang et al, (Contextual Object Detection with Multimodal Large Language Models, Aug. 12, 2024) (Year: 2024).*

Sharma et al, ("Signature and Logo Detection using Deep CNN for Document Image Retrieval", 2018 IEEE, pp. 416-422) (Year: 2018).*

Girshick et al, ("Rich feature hierarchies for accurate object detection and semantic segmentation", arXiv e-prints, p.arXiv:1311.2524, Oct. 22, 2014) (Year: 2014).*

The Federal Reserve, Check Services, Jun. 24, 2025, https://www.federalreserve.gov/paymentsystems/check_govcheckprocqtr.htm.

Gorski et al., A2iA Check Reader: a family of bank check recognition systems, in Proceedings of the Fifth International Conference on Document Analysis and Recognition. ICDAR '99 (Cat. No. PR00318), 1999.

Gorski et al., Industrial bank check processing: the A2iA CheckReaderTM, International Journal on Document Analysis and Recognition, vol. 3, pp. 196-206, 2001.

Shukla et al., Artificial Intelligence Approach for Signature Detection, in Convergence of Cloud with AI for Big Data Analytics, John Wiley & Sons, Ltd, pp. 387-400, 2023.

Tappert et al., The state of the art in online handwriting recognition, IEEE Transactions on Pattern Analysis and Machine Intelligence, vol. 12, pp. 787-808, Aug. 1990.

Soelistio et al., A Review of Signature Recognition Using Machine Learning, in 2021 1st International Conference on Computer Science and Artificial Intelligence (ICCSAI), 2021.

Hashim et al., A Comparative Study among Handwritten Signature Verification Methods Using Machine Learning Techniques, Scientific Programming, Oct. 15, 2022.

Girshick et al., Rich feature hierarchies for accurate object detection and semantic segmentation, arXiv e-prints, p. arXiv:1311.2524, Oct. 22, 2014.

Redmon et al., You Only Look Once: Unified, Real-Time Object Detection, arXiv e-prints, p. arXiv:1506.02640, May 9, 2016.

Carion et al., End-to-End Object Detection with Transformers, arXiv e-prints, p. arXiv:2005.12872, May 28, 2020.

Zhu et al., Deformable DETR: Deformable Transformers for End-to-End Object Detection, arXiv e-prints, p. arXiv:2010.04159, Mar. 18, 2021.

Minderer et al., Simple Open-Vocabulary Object Detection with Vision Transformers, arXiv e-prints, p. arXiv:2205.06230, Jul. 20, 2022.

Minderer et al., Scaling Open-Vocabulary Object Detection, arXiv e-prints, p. arXiv:2306.09683, May 22, 2024.

Liu et al., Grounding DINO: Marrying DINO with Grounded Pre-Training for Open-Set Object Detection, arXiv e-prints, p. arXiv:2303.05499, Jul. 19, 2024.

Dosovitskiy et al., An Image is Worth 16×16 Words: Transformers for Image Recognition at Scale, arXiv e-prints, p. arXiv:2010.11929, Jun. 3, 2021.

Radford et al., Learning Transferable Visual Models From Natural Language Supervision, arXiv e-prints, p. arXiv:2103.00020, Feb. 26, 2021.

Lin et al., Microsoft COCO: Common Objects in Context, arXiv e-prints, p. arXiv: 1405.0312, Feb. 21, 2015.

Zang et al., Contextual Object Detection with Multimodal Large Language Models, arXiv e-prints, p. arXiv:2305.18279, Aug. 12, 2024.

Zhao et al., LLM-Optic: Unveiling the Capabilities of Large Language Models for Universal Visual Grounding, p. arXiv:2405.17104, May 28, 2024.

Shinn et al ., Reflexion: Language Agents with Verbal Reinforcement Learning, arXiv e-prints, p. arXiv:2303.11366, Oct. 10, 2023.

Tanaka, editdistance 0.8.1, Feb. 10, 2024, Available: https://pypi.org/project/editdistance/.

Smith, An Overview of the Tesseract OCR Engine, Ninth International Conference on Document Analysis and Recognition (ICDAR 2007), vol. 2, pp. 629-633, 2007.

Li et al., TrOCR: Transformer-based Optical Character Recognition with Pre-trained Models, arXiv e-prints, p. arXiv:2109.10282, Sep. 6, 2022.

Dutta et al., The VIA Annotation Software for Images, Audio and Video, Proceedings of the 27th ACM International Conference on Multimedia, Aug. 9, 2019.

Plamondon et al., Online and off-line handwriting recognition: a comprehensive survey, IEEE Transactions on Pattern Analysis and Machine Intelligence, vol. 22, pp. 63-84, Jan. 2000.

The Federal Reserve, Federal Reserve Payments Study (FRPS), Mar. 12, 2025, https://www.federalreserve.gov/paymentsystems/fr-payments-study.htm.

Girshick, Fast R-CNN, arXiv e-prints, p. arXiv:1504.08083, Sep. 27, 2015.

Ren et al., Faster R-CNN: Towards Real-Time Object Detection with Region Proposal Networks, arXiv e-prints, p. arXiv:1506.01497, Jan. 6, 2016.

Terven et al., A Comprehensive Review of YOLO Architectures in Computer Vision: From YOLOv1 to YOLOv8 and YOLO-NAS, arXiv e-prints, p. arXiv:2304.00501, Feb. 4, 2024.

Khanam et al., YOLOv11: An Overview of the Key Architectural Enhancements, arXiv e-prints, p. arXiv:2410.17725, Oct. 23, 2024.

Zhao et al., DETRs Beat YOLOs on Real-time Object Detection, arXiv e-prints, p. arXiv:2304.08069, Apr. 3, 2024.

Ashqar et al., The Use of Multimodal Large Language Models to Detect Objects from Thermal Images: Transportation Applications, arXiv e-prints, p. arXiv:2406.13898, 2024.

Karamcheti et al., Language-Driven Representation Learning for Robotics, arXiv e-prints, Feb. 24, 2023.

Wang et al., OCC-MLLM-CoT-Alpha: Towards Multi-stage Occlusion Recognition Based on Large Language Models via 3D-Aware Supervision and Chain-of-Thoughts Guidance, arXiv e-prints, Apr. 7, 2025.

Fu et al., BLINK: Multimodal Large Language Models Can See but Not Perceive, arXiv e-prints, p. arXiv:2404.12390, Jul. 3, 2024.

* cited by examiner

MODULE 1

200A

MODULE 2

300

HON. GERALD R. FORD
MRS. BETTY B. FORD

878

15.4
540
1

January 13 19 75

$ 25.00

Pay to the order of

Presiding Bishop, Episcopal Church

Twenty-five and no / 100 ——————— Dollars

WASHINGTON'S OLDEST NATIONAL BANK
THE FIRST NATIONAL BANK
OF WASHINGTON
WASHINGTON, D.C.

Memo World hunger relief

⑆O54O⑆⑆OOO4⑆: '⑈4O⑉6⑈1 6⑈ '⑈OOOOOO 25OO'

*Fig. 4*

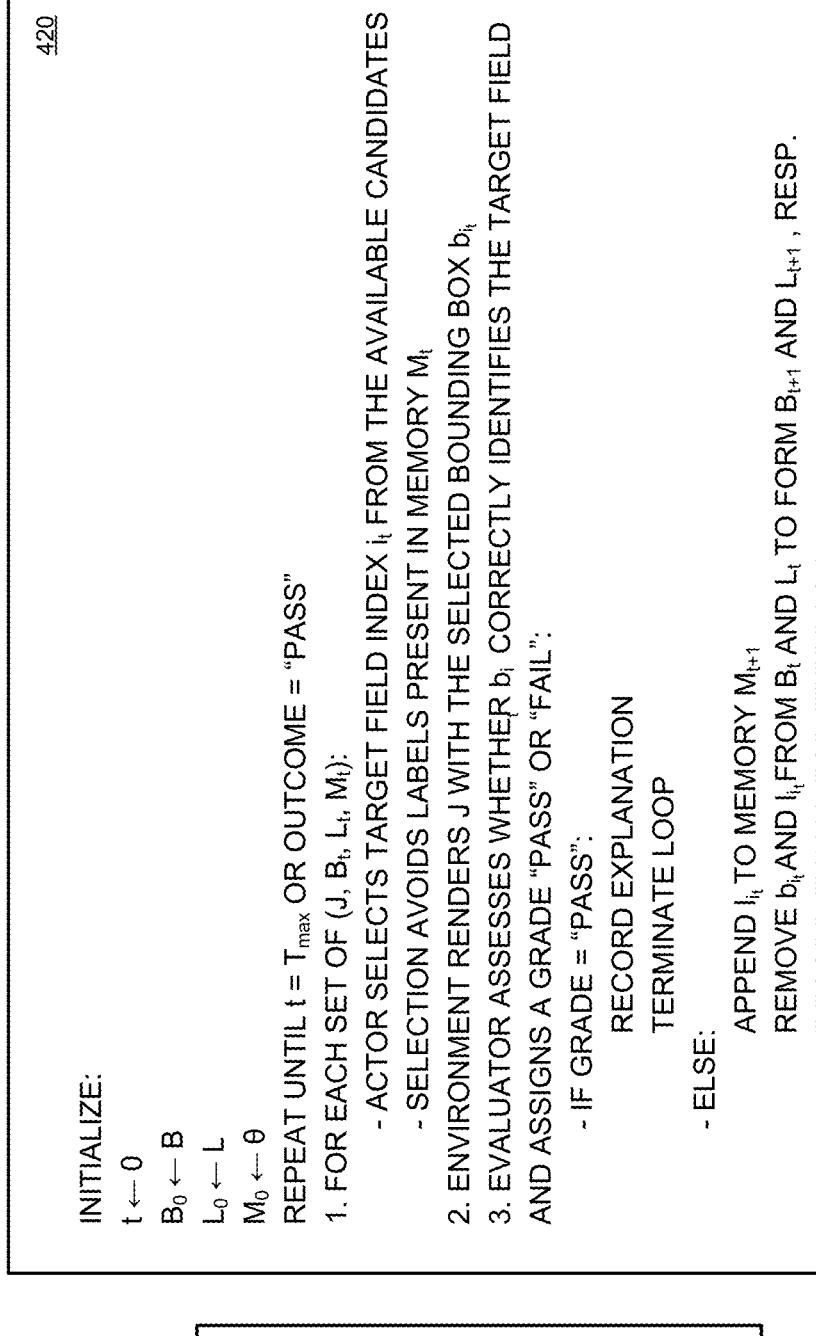

420

INITIALIZE:

$t \leftarrow 0$ $B_0 \leftarrow B$ $L_0 \leftarrow L$ $M_0 \leftarrow \theta$

REPEAT UNTIL $t = T_{max}$ OR OUTCOME = "PASS"

1. FOR EACH SET OF $(J, B_t, L_t, M_t)$:

- ACTOR SELECTS TARGET FIELD INDEX $i_t$ FROM THE AVAILABLE CANDIDATES

- SELECTION AVOIDS LABELS PRESENT IN MEMORY $M_t$

2. ENVIRONMENT RENDERS J WITH THE SELECTED BOUNDING BOX $b_{i_t}$

3. EVALUATOR ASSESSES WHETHER $b_i$ CORRECTLY IDENTIFIES THE TARGET FIELD AND ASSIGNS A GRADE "PASS" OR "FAIL":

- IF GRADE = "PASS":

RECORD EXPLANATION

TERMINATE LOOP

- ELSE:

APPEND $l_{i_t}$ TO MEMORY $M_{t+1}$

REMOVE $b_{i_t}$ AND $l_{i_t}$ FROM $B_t$ AND $L_t$ TO FORM $B_{t+1}$ AND $L_{t+1}$, RESP.

RECORD EVALUATOR FEEDBACK

4. $t \leftarrow t+1$

AAA
400

ACTOR
402

ENVIRONMENT
404

EVALUATOR
406

MEMORY
408

INITIALIZE : $j \leftarrow 0$

REPEAT UNTIL $j$ = LENGTH OF R:

1. CALCULATE THE CER ($C_j$) BETWEEN $r_j$ AND V
2. STORE IN I THE INDICES OF $C_j$ ELEMENTS WITH $C_{jk} < C_0$; WHERE $k = 0, 1, \ldots, n$
3. INITIALIZE:
$$V' \leftarrow \theta$$
$$C'_j \leftarrow \theta$$
$$M \leftarrow 0$$
$$I' \leftarrow \theta$$

REPEAT UNTIL $m$ = LENGTH OF I:
 A) ENVIRONMENT RENDERS J WITH THE BOUNDING BOX $b_i$ WHERE $i \in I$
 B) EVALUATOR ASSESSES WHETHER $b_i$ CORRECTLY IDENTIFIED THE TARGET FIELD AND ASSIGNS A GRADE "PASS" OR "FAIL":
  - IF GRADE = "PASS":
     APPEND I' WITH $i_m$

C) $m \leftarrow m+1$

IF $I' \neq \theta$:
 A) PERFORM OCR ON THE CROPPED BOUNDING BOXES $b_{i'}$, WHERE $i' \in I'$ AND APPEND V'
 B) CALCULATE THE CER ($C'_j$) BETWEEN $r_j$ AND V'
 C) IDENTIFY THE INDEX $i_f$ FOR THE SMALLEST COMPONENT OF $C'_j$
   IF MULTIPLE COMPONENTS OF $C'_j$ HAVE THE SAME SMALLEST VALUE:
     SELECT $i_f$ THAT HAS THE LEAST CORRESPONDING BOUNDING BOX AREA
 D) THE FINAL SELECTED BOUNDING BOX FOR THE TARGET FIELD IS $b_{if}$ 4. $j \leftarrow j+1$

*Fig. 6C*

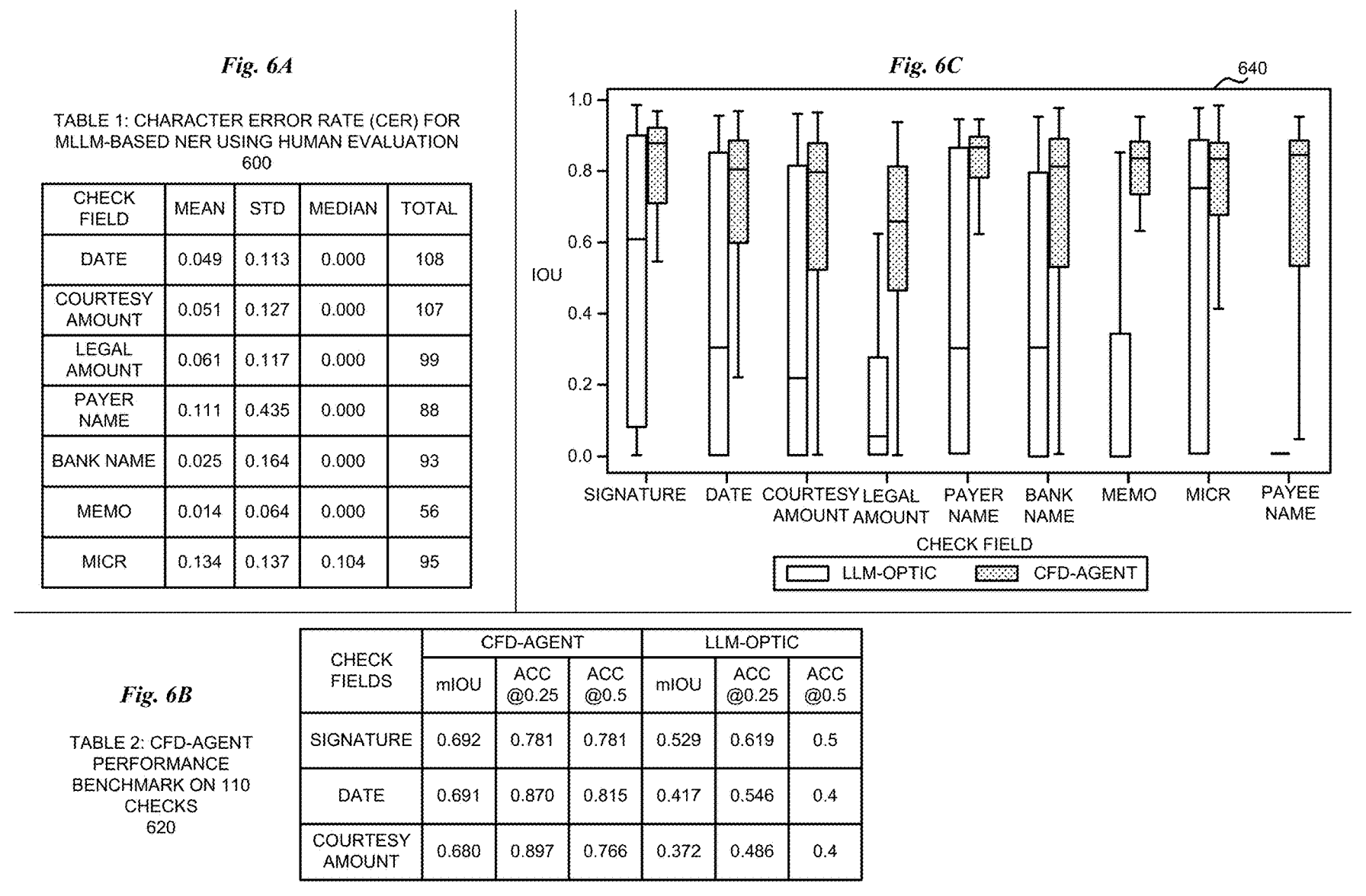

TABLE 1: CHARACTER ERROR RATE (CER) FOR MLLM-BASED NER USING HUMAN EVALUATION
600

| CHECK FIELD | MEAN | STD | MEDIAN | TOTAL |
|---|---|---|---|---|
| DATE | 0.049 | 0.113 | 0.000 | 108 |
| COURTESY AMOUNT | 0.051 | 0.127 | 0.000 | 107 |
| LEGAL AMOUNT | 0.061 | 0.117 | 0.000 | 99 |
| PAYER NAME | 0.111 | 0.435 | 0.000 | 88 |
| BANK NAME | 0.025 | 0.164 | 0.000 | 93 |
| MEMO | 0.014 | 0.064 | 0.000 | 56 |
| MICR | 0.134 | 0.137 | 0.104 | 95 |

*Fig. 6A*

TABLE 2: CFD-AGENT PERFORMANCE BENCHMARK ON 110 CHECKS
620

| CHECK FIELDS | CFD-AGENT | | | LLM-OPTIC | | |
|---|---|---|---|---|---|---|
| | mIOU | ACC @0.25 | ACC @0.5 | mIOU | ACC @0.25 | ACC @0.5 |
| SIGNATURE | 0.692 | 0.781 | 0.781 | 0.529 | 0.619 | 0.5 |
| DATE | 0.691 | 0.870 | 0.815 | 0.417 | 0.546 | 0.4 |
| COURTESY AMOUNT | 0.680 | 0.897 | 0.766 | 0.372 | 0.486 | 0.4 |

*Fig. 6B*

TRAINING-FREE FRAMEWORK FOR ZERO-SHOT CHECK FIELD DETECTION

RELATED APPLICATION

The present application is a CONTINUATION of U.S. patent application Ser. No. 19/270,987, titled TRAINING-FREE FRAMEWORK FOR ZERO-SHOT CHECK FIELD DETECTION and filed on Jul. 16, 2025.

BACKGROUND

Zero-shot detection refers to the ability of a model to detect and recognize objects or entities that it has never seen during training, based only on semantic descriptions, such as text labels, attributes, or natural language prompts. "Zero-shot" means the model hasn't been trained on examples of the specific target class. Detection refers to not just recognizing a class but also locating an object belonging to that class in an image or data, e.g., by drawing a bounding box around an object in an image.

Suppose a model has been trained on animals like "dog," "cat," and "horse." In zero-shot detection, when the model is asked to detect a "zebra", which the model has never seen, the model would use its understanding of what a "zebra" is, such as from word embeddings, text descriptions, or language models. Using that understanding, the model would search the source image for regions that match that semantic concept, and output a bounding box around the object the model concludes is a zebra. This type of detection is often implemented by combining a visual backbone such as CLIP (Contrastive Language-Image Pre-training) or ViT (Vision Transformer)) with a language model or text embedding that understands concepts.

An object detection model is a type of machine learning model—often a deep learning model—that can identify what objects are present in an image and locate each object by drawing bounding boxes around them. For a given input image, an object detection model outputs the classes of objects it finds, e.g., "dog", "car", "person", the location of each object as a bounding box (x, y, width, height), and often a confidence score for each detection.

Common object detection models include YOLO (You Only Look Once), which is fast and widely used for real-time detection; SSD (Single Shot MultiBox Detector), which detects multiple objects in a single pass; Faster R-CNN, which is more accurate but slower and uses region proposals and CNNs (Convolution Neural Networks); and DETR (DEtection TRansformer), a transformer-based model that treats detection like language with less hand-tuning.

Object detection can be distinguished from related tasks such as image classification, which labels the whole image with a class (e.g., "dog"); instance segmentation, which is similar to detection but with pixel-level masks; and semantic segmentation, which labels each pixel by class, not instances.

A transformer-based architecture is a deep learning model architecture originally designed for sequence modeling tasks, but it's now used across many domains, including vision, audio, and multimodal tasks. The transformer replaces traditional RNNs (Recurrence Neural Networks) or CNNs with a mechanism called self-attention, which allows the model to look at all parts of the input at once, learn relationships between all tokens, no matter how far apart they are, and scale better with parallel computation, especially on GPUs (Graphical Processing Units).

The core components of a transformer include self-attention, where each token attends to all other tokens to compute its contextual representation; multi-head attention, which runs multiple attention mechanisms in parallel to learn different types of relationships; positional encoding, which adds position information to the input so the model knows the order of tokens; feedforward networks, which pass each token's representation through fully connected layers independently; and layer normalization and residual connections, which help with training stability and gradient flow.

An open vocabulary vision model is a computer vision system that can recognize and detect objects beyond a fixed, predefined set of labels using natural language or textual descriptions as input instead. Traditional models (like YOLO or Faster R-CNN) are closed vocabulary—they can only detect the classes they were explicitly trained on (e.g., 80 COCO classes like "dog", "car", "person"). In contrast, an open vocabulary model can take any text prompt (e.g., "penguin", "red sports car", "traffic light with cracks"), find that object or concept in the image, even if it was never trained on that specific class.

Open vocabulary vision models typically combine a visual encoder (e.g., a CNN, ViT) that converts an image or image regions into embeddings; a text encoder (e.g., from CLIP or a transformer) that converts the text label or prompt into an embedding; an alignment space where the model is trained so that matching images and text have similar vector representations; and similarity matching at test time to find visual regions that match the given text input.

SUMMARY

The present disclosure includes inventive concepts relating generally to generating code for a graphical user interface, such as methods, systems, and computer programs for training-free framework for zero-shot check field detection. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method includes receiving input data in a first branch that includes a first Vision-Language Model (VLM). The input data includes a facsimile representation of a paper document. The first VLM identifies a first set of fields in the input data using visualized first set of bounding boxes (BB). The first VLM labels the first set of fields to produce a labeled first set of fields. A first agentic Artificial Intelligence architecture (AAA-1) executes in the first branch, causing localization of an identified field as a desired type of field using a corresponding visualized identified BB from the first set of BBs. The first branch outputs a localized and labeled identified field. The input data is passed to a second branch that includes a second VLM and a Multimodal Large Language Model (MLLM). The second VLM identifies a second set of fields in the input data using visualized second set of BBs. The input data with the second set of BBs is passed to the MLLM, which executes in the second branch and outputs a set of recognizing fields within BBs of the second set of BBs. A second agentic Artificial Intelligence architecture (AAA-2) executes in the second branch, localizing at least one recognized field as a target field. The target field is labeled to produce a labeled target field from the second branch. The input data, the labeled identified field, and the labeled target field are combined to form labeled data in a training data set.

The embodiment further involves training a model using the training data set. The training configures the model to detect a set of fields in a set of check specimens.

The embodiment further involves deploying the model as a trained check field detection (CFD) model.

The embodiment further involves outputting from the trained CFD model an identification of a signature field in production check data. The content of the signature field is input into a transaction processing system as part of processing the check data.

The embodiment further involves outputting from the trained CFD model an identification of at least one other check field in production check data. The content of the at least one other check field is additionally input into the transaction processing system.

The at least one other check field is one of a payer field, a payee field, a courtesy amount field, or a legal amount field.

The target field is a Magnetic Ink Character Recognition (MICR) field. The embodiment further involves extending a BB bounding the MICR field to an edge of the input data.

The embodiment further involves resizing the input data so that a resized image comprising the input data conforms to specified minimum dimensions.

The resizing involves padding the input data.

The embodiment further involves converting a complex query about the input data into a short prompt using a different model. The short prompt is provided as an input to the first VLM.

A computer program product includes one or more computer-readable storage media and program instructions stored on the media. The program instructions are executable by a set of one or more processors to perform operations. The operations include receiving input data in a first branch that includes a first Vision-Language Model (VLM). The input data includes a facsimile representation of a paper document. The first VLM identifies a first set of fields in the input data using visualized first set of bounding boxes (BB). The first VLM labels the first set of fields to produce a labeled first set of fields. A first agentic Artificial Intelligence architecture (AAA-1) executes in the first branch, causing localization of an identified field as a desired type of field using a corresponding visualized identified BB from the first set of BBs. The first branch outputs a localized and labeled identified field. The input data is passed to a second branch that includes a second VLM and a Multimodal Large Language Model (MLLM). The second VLM identifies a second set of fields in the input data using visualized second set of BBs. The input data with the second set of BBs is passed to the MLLM, which executes in the second branch and outputs a set of recognizing fields within BBs of the second set of BBs. A second agentic Artificial Intelligence architecture (AAA-2) executes in the second branch, localizing at least one recognized field as a target field. The target field is labeled to produce a labeled target field from the second branch. The input data, the labeled identified field, and the labeled target field are combined to form labeled data in a training data set.

The operations further involve training a model using the training data set. The training configures the model to detect a set of fields in a set of check specimens.

The operations further involve deploying the model as a trained check field detection (CFD) model.

The operations further involve outputting from the trained CFD model an identification of a signature field in production check data. The content of the signature field is input into a transaction processing system as part of processing the check data.

The operations further involve outputting from the trained CFD model an identification of at least one other check field in production check data. The content of the at least one other check field is additionally input into the transaction processing system.

The at least one other check field is one of a payer field, a payee field, a courtesy amount field, or a legal amount field.

The target field is a Magnetic Ink Character Recognition (MICR) field. The operations further involve extending a BB bounding the MICR field to an edge of the input data.

The stored program instructions are stored in a computer-readable storage device in a data processing system. The stored program instructions are transferred over a network from a remote data processing system.

The stored program instructions are stored in a computer-readable storage device in a server data processing system. The stored program instructions are downloaded in response to a request over a network to a remote data processing system for use in a computer-readable storage device associated with the remote data processing system. The operations further involve metering the use of the program instructions associated with the request and generating an invoice based on the use.

A computer system includes a set of one or more processors and one or more computer-readable storage media. Program instructions are stored on the media and are executable by the processors to perform operations. The operations include receiving input data in a first branch that includes a first Vision-Language Model (VLM). The input data includes a facsimile representation of a paper document. The first VLM identifies a first set of fields in the input data using visualized first set of bounding boxes (BB). The first VLM labels the first set of fields to produce a labeled first set of fields. A first agentic Artificial Intelligence architecture (AAA-1) executes in the first branch, causing localization of an identified field as a desired type of field using a corresponding visualized identified BB from the first set of BBs. The first branch outputs a localized and labeled identified field. The input data is passed to a second branch that includes a second VLM and a Multimodal Large Language Model (MLLM). The second VLM identifies a second set of fields in the input data using visualized second set of BBs. The input data with the second set of BBs is passed to the MLLM, which executes in the second branch and outputs a set of recognizing fields within BBs of the second set of BBs. A second agentic Artificial Intelligence architecture (AAA-2) executes in the second branch, localizing at least one recognized field as a target field. The target field is labeled to produce a labeled target field from the second branch. The input data, the labeled identified field, and the labeled target field are combined to form labeled data in a training data set.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

FIG. 4 depicts various manifestations of a process implemented as an agentic AI architecture for module 1 in accordance with an illustrative embodiment.

FIG. 5 depicts various manifestations of a process implemented as an agentic AI architecture for module 2 in accordance with an illustrative embodiment.

FIG. 6A depicts a table which describes certain character error rates observed in an experimental implementation of an illustrative embodiment.

FIG. 6B depicts a table which shows comparative performance of a CFD-Agent's performance and LLM-Optic for some example object detection metrics in an experimental implementation of an illustrative embodiment.

FIG. 6C depicts a graph which plots a distribution certain example target fields detected in an experimental implementation of an illustrative embodiment.

DETAILED DESCRIPTION

Figure 1:
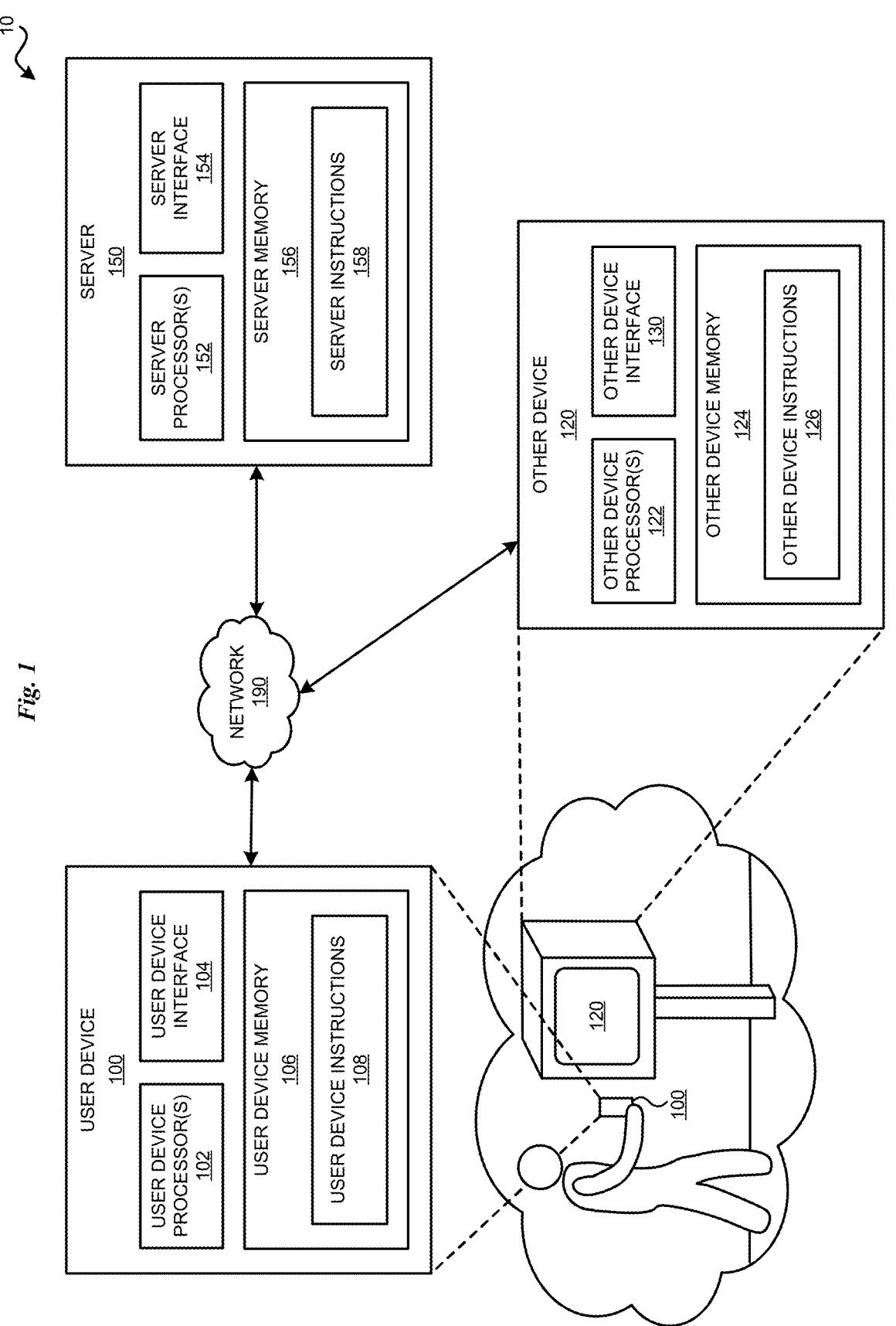
FIG. 1 depicts a block diagram of a computing environment in which an illustrative embodiment may be implemented.

Unless expressly distinguished where used, a "check" or "cheque" (collectively and interchangeably referred to hereinafter as "check") as used herein refers to the financial transaction document issued by a payor (payer) in the name of a payee and drawn on an account with a financial institution for a specified sum of money. The document may contain additional information thereon and normally takes a physical paper document, but is increasingly also presented in the form of a digital image and other electronic representations of the physical paper document. For the purposes of the illustrative embodiment, a check in any form is presumed to contain the specific data elements described herein. These data elements are interchangeably referred to as check data fields or check fields. The problems described herein and solved by the illustrative embodiments relate to checks and check representations that look like the paper check document from a checkbook, and could but don't necessarily apply to electronically transmitted structured transaction data that is designed to functionally operate in lieu of a check.

The illustrative embodiments recognize that checks remain a foundational instrument in the financial ecosystem, facilitating substantial transaction volumes across institutions. However, their continued use also renders them a persistent target for fraud, underscoring the importance of robust check fraud detection mechanisms. At the core of such systems lies the accurate identification and localization of check data fields, such as the fields containing the data (check data) of the signature, magnetic ink character recognition (MICR) line, courtesy amount (numeric representation of the amount of the check), legal amount (textual representation of the amount of the check), payee, and payer, which are used for subsequent verification against reference documents of an authorized operator of the account. This field-level detection is traditionally dependent on object detection models trained on large, diverse, and meticulously labelled datasets, a resource that is scarce for check data due to proprietary and privacy concerns.

The illustrative embodiments introduce a novel, training-free framework for automated check field detection, leveraging the power of a visual language model (VLM) in conjunction with a multimodal large language model (MLLM) to enable zero-shot detection of check components, significantly lowering the barrier to deployment in real-world financial settings. Quantitative evaluation of the proposed model on a hand-curated dataset of 110 checks spanning multiple formats and layouts demonstrates strong performance and generalization capability. Furthermore, this framework can serve as a bootstrap mechanism for generating high-quality labelled datasets, enabling the development of specialized, real-time object detection models tailored to institutional needs.

Despite the growing adoption of electronic payment systems-including automated clearing house (ACH) transfers, wire transfers, and credit or debit cards, checks continue to play a critical role in financial transactions, particularly in high-value business-to-business (B2B) and government payments. The Federal Reserve reported approximately 36 million checks were processed in 2024 which amounted to a total of $17.6 trillion. These figures underscore the continued economic significance of checks, even as digital payment alternatives proliferate.

Before the advent of AI (Artificial Intelligence), banks employed a combination of manual and simple rule-based systems to process and verify checks for fraud prevention (such as high amount or unusual locations). The rise of mobile check deposits via smartphone apps has improved convenience but also introduced new fraud risks due to poor image quality and digital tampering.

The illustrative embodiments recognize that these challenges highlight the need for robust, automated systems that can scale reliably. The illustrative embodiments recognize that a critical step in check processing, mobile check deposit, and in the appurtenant fraud detection is the accurate extraction of data (features, check features) from certain check fields from check images. These extracted features include but not limited to the signature, legal amount, courtesy amount, date, MICR line (which includes data for routing number, account number, and check number), payer name, payee name, memo and bank name. The reliable extraction of these features is a crucial step in downstream tasks such as semantic analysis and anomaly detection. Although they presently suffer from the problems identified and remedied by the illustrative embodiments, machine learning (ML) based object detection models provide a promising pathway for automatic localization and extraction of critical check elements, enabling more scalable, consistent, and timely fraud prevention.

The illustrative embodiments recognize that traditional ML-based object detection models for check field extraction require fine-tuning on large, annotated datasets spanning diverse formats. The illustrative embodiments recognize that such datasets are difficult to curate for check data due to privacy constraints, limited availability, and the diverse visual structures of checks, thus limiting scalability. The illustrative embodiments recognize that as a result, there is a need for training-free, generalizable frameworks that work without labeled data. Advances in foundation models like LLMs and multimodal generative AI offer strong zero- and few-shot capabilities, that the illustrative embodiments use in the described architecture to enable scalable, plug-and-play solutions for financial document processing without task-specific training.

The illustrative embodiments present a framework that combines a visual-language model (VLM) and a multimodal LLM (MLLM) to perform zero-shot object detection on bank checks. While both models are multimodal, the illustrative embodiments distinguish VLM from MLLM in use due to the latter's superior reasoning capabilities. In the described architecture of the illustrative embodiments, the VLM proposes bounding boxes from text prompts, and the MLLM selects the correct one. This approach requires no task-specific training or fine-tuning. Evaluated on a diverse, hand-curated set of 101 checks, this framework accurately identified key fields despite no prior exposure, highlighting its potential as a general-purpose tool for check analysis.

The proposed architecture of an embodiment can also serve as a data labeling pipeline to generate training datasets for specialized models aimed at real-time deployment. Given a volume of checks or check representations, the architecture operates to correctly recognize and label check fields in the output. The labeled output can be included in a training dataset to train a conventional pre-trained classifier model.

Object Detection Models

Object detection has advanced from early CNN-based models like R-CNN and YOLO to transformer-based architectures such as DETR and Deformable DETR, which improve global context understanding. More recently, vision language models like OWL-ViT, OWLv2, and Grounding DINO have enabled open-vocabulary and zero-shot detection using Vision Transformers and CLIP. These models are usually trained on large common object detection datasets such as MS COCO and they are focused towards a more generalized and flexible object detection paradigm. Although these object detection models have demonstrated good detection capabilities in a wide variety of applications, the illustrative embodiments recognize that the biggest challenge in check field detection (CFD) remains a challenge due to the lack of availability of large enough labelled datasets of checks for training these models. The creation of large and diverse datasets of bank check images, with a specific focus on fraudulent examples, is vital for training more accurate and generalizable models. Those of ordinary skill in the art will recognize from this disclosure that an embodiment can be implemented to generate labeled check fields in the output and that output can be used to construct such a training dataset for check processing, check analysis, and fraud detection in check transactions.

Multimodal Large Language Model (MLLM)

Multimodal Large Language Models (MLLMs) combine visual and textual inputs for richer, context-aware understanding. The illustrative embodiments recognize that while these models excel at tasks like image captioning, visual question answering, and text extraction from bank checks such as optical character recognition (OCR) and named entity recognition (NER), they remain less effective at precise object localization, limiting their accuracy in detecting specific check fields.

A framework called ContextDET advances contextual object detection by aligning visual objects with language inputs in interactive scenarios. The illustrative embodiments recognize that while this framework is effective, its reliance on task-specific training data limits its applicability-especially for domains like check field detection, where annotated datasets are scarce.

An LLM-Optic method is used to resolve difficulties in visual grounding, particularly with intricate text queries. This method capitalizes on the power of LLMs to bolster text query understanding using a Text Grounder, followed by using a pre-trained VLM to propose potential object locations in images and refining these proposals with a MLLM acting as a Visual Grounder. This method allows zero-shot visual grounding and shows improvements over existing benchmarks without the need for further model training, but remains deficient for check field detection for the same reasons as described earlier. As presented herein, the illustrative embodiments present an architecture that extends and enables the LLM-Optic to reliably perform check field detection by augmenting the LLM-optic architecture with agentic AI and OCR capabilities of MLLM in the manner described herein.

Methodology

The CFD-Agent framework builds on the conceptual design of LLM-Optic with an additional enhancement using a multimodal agentic AI strategy for the domain-specific application of check field detection. The LLM-Optic framework uses an open vocabulary vision model, Grounding DINO, to perform object detection which resulted in candidate objects being selected. Although this strategy works well for open world object detection scenarios (since the VLM was trained on open world image data), resulting in only a limited number of candidate objects for the MLLM to select from, it has limited applicability in check field detection. This limitation arises because the named entity recognition (NER) task involved with check field detection is a highly specialized application and specific text prompts such as "payer name", "signature", etc., do not result in accurate detections. Rather, in the current implementations of the LLM-Optic framework, these prompts are interpreted by the VLM in a general manner such as "check fields" or "texts", thus resulting in a huge number of detections of various texts and markings on checks, which are often overlapped. Therefore, the illustrative embodiments recognize that a more enhanced and sophisticated framework is necessary to select the best bounding box from the large number of candidate boxes detected by the VLM.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 900 of FIG. 9. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 912 of FIG. 9.

The one or more user device interfaces 104 are one or more components of user device 100 that facilitate receiving input from and providing output to something external to user device 100. The one or more user device interfaces 104 can include one or more aspects described below in relation to the one or more interfaces 918 of FIG. 9.

User device memory 106 is a collection of one or more components of user device 100 configured to store instructions and data for later retrieval and use. User device memory 106 can include one or more aspects described below in relation to memory 914 of FIG. 9. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal—such as an electronic payment terminal, an automated customer interaction machine or device—such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 912 of FIG. 9.

Other device memory 124 is a collection of one or more components of other device 120 configured to store instructions and data for later retrieval and use. Other device memory 120 can include one or more aspects described below in relation to memory 914 of FIG. 9. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 918 of FIG. 9.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 912 of FIG. 9.

The one or more server interfaces 154 are one or more components of server 150 that facilitate receiving input from and providing output to something external to server 150. The one or more server interfaces 154 can include one or more aspects described below in relation to the one or more interfaces 918 of FIG. 9.

Server memory 150 is a collection of one or more components of server 150 configured to store instructions and data for later retrieval and use. Server memory 150 can include one or more aspects described below in relation to memory 914 of FIG. 9. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2A:
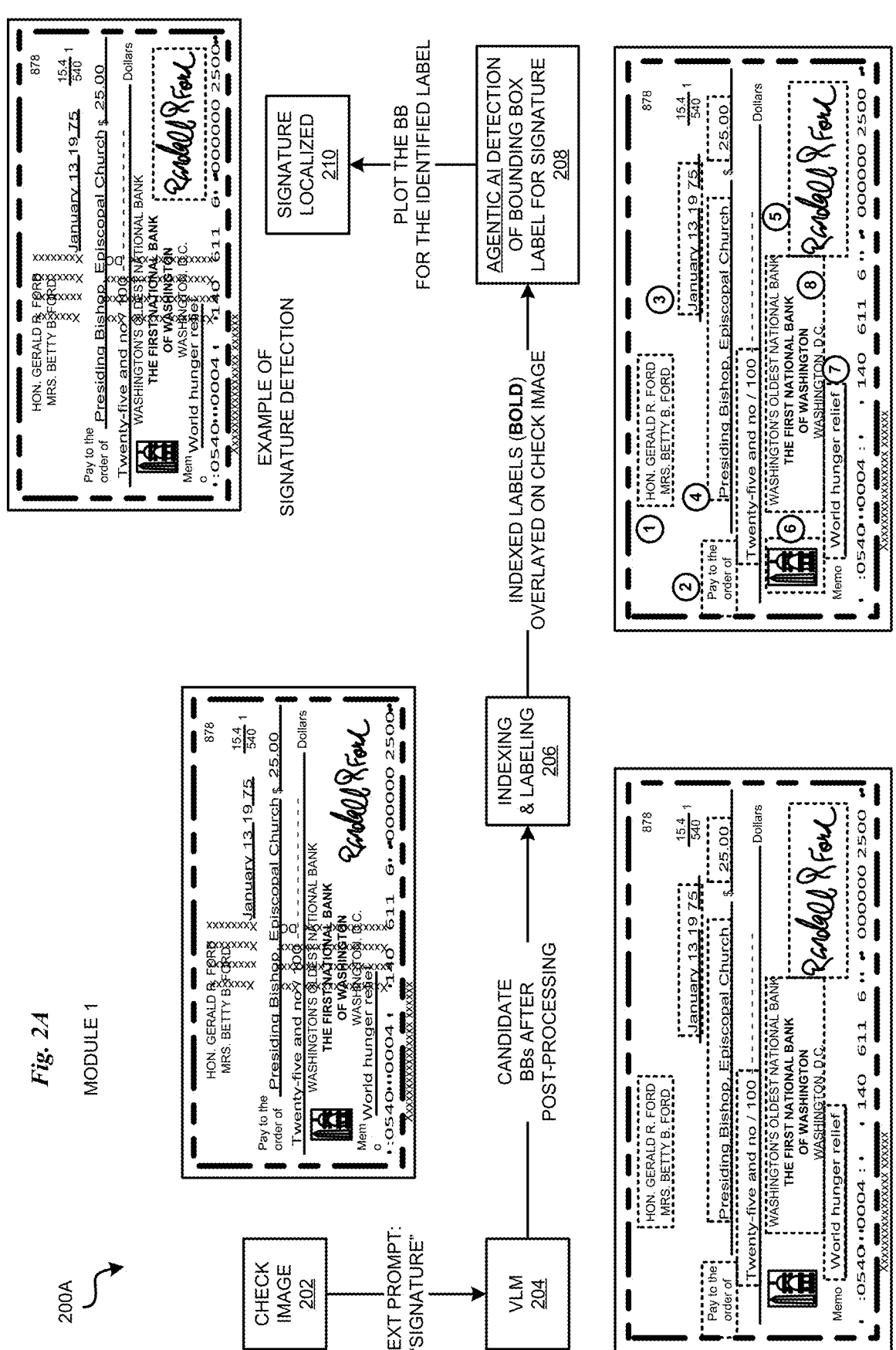
FIG. 2A depicts a schematic of module 1 as described herein along with one or more intermediate outputs on a sample check.
Figure 2B:
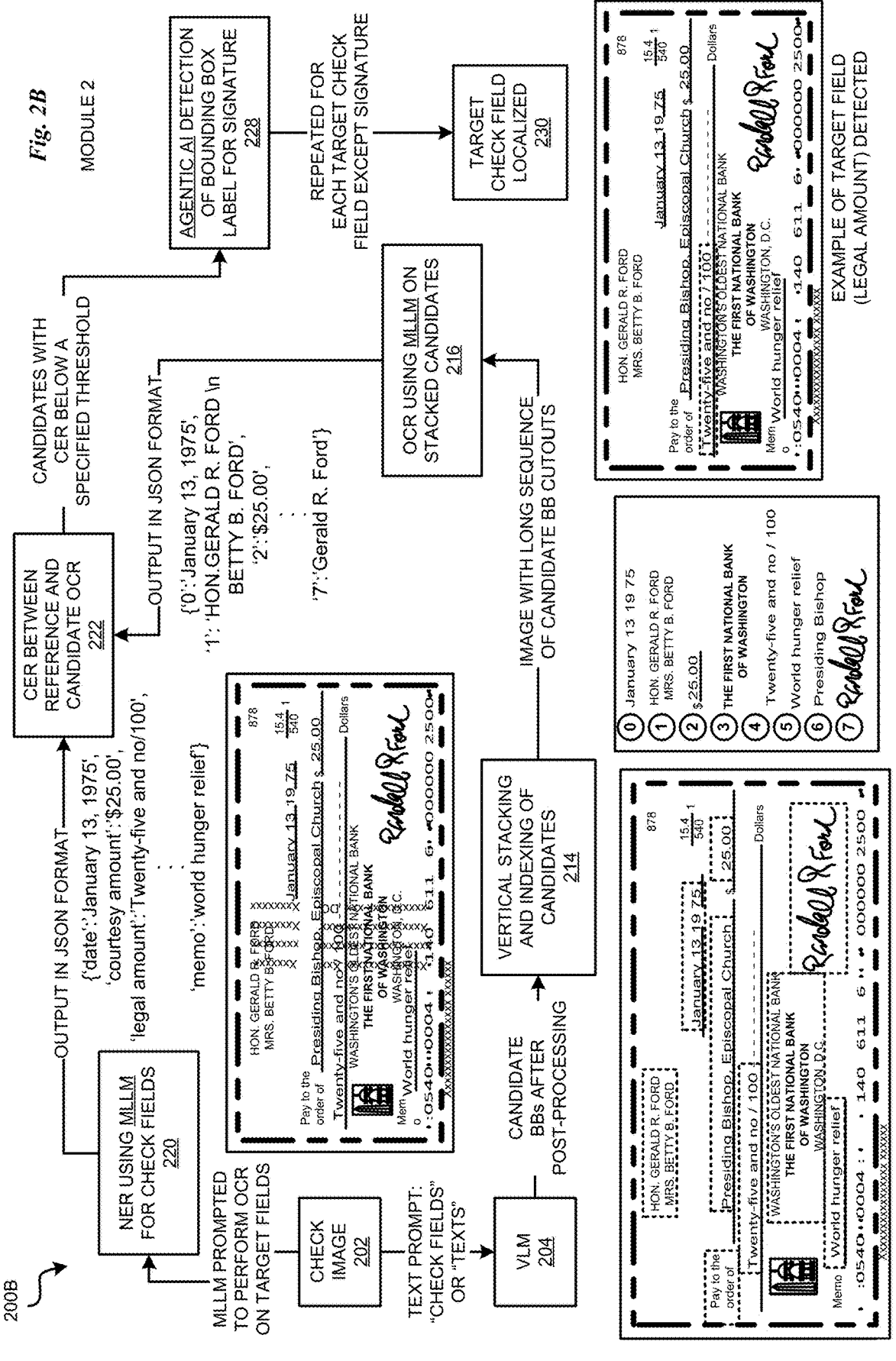
FIG. 2B depicts a schematic of Module 2 (OCR-based check field detection) in accordance with an illustrative embodiment.

FIG. 2A-2B together depict a schematic of a workflow of the proposed framework in accordance with an illustrative embodiment. FIG. 2A depicts a schematic of module 1 as described herein along with one or more intermediate outputs on a sample check.

The framework according to an embodiment has two modules for check field detection based on the field of interest: module 1 (200A in FIG. 2A) for signature detection and module 2 (200B in FIG. 2B) for the detection of the remaining fields. This is because for all the check fields in check image 202 except the signature field, it is most often feasible to perform OCR, which is a step in the detection process in module 2. Whereas, for the signature, performing accurate OCR is not a necessity and may not always be possible, so the framework follows a different approach in module 1. Based on the experiments, the observations showed that the approach in module 2 is faster and more accurate than that in module 1 for fields in which OCR can be performed, and therefore, the separation of the two modules delivers a desirable outcome.

Figure 3:
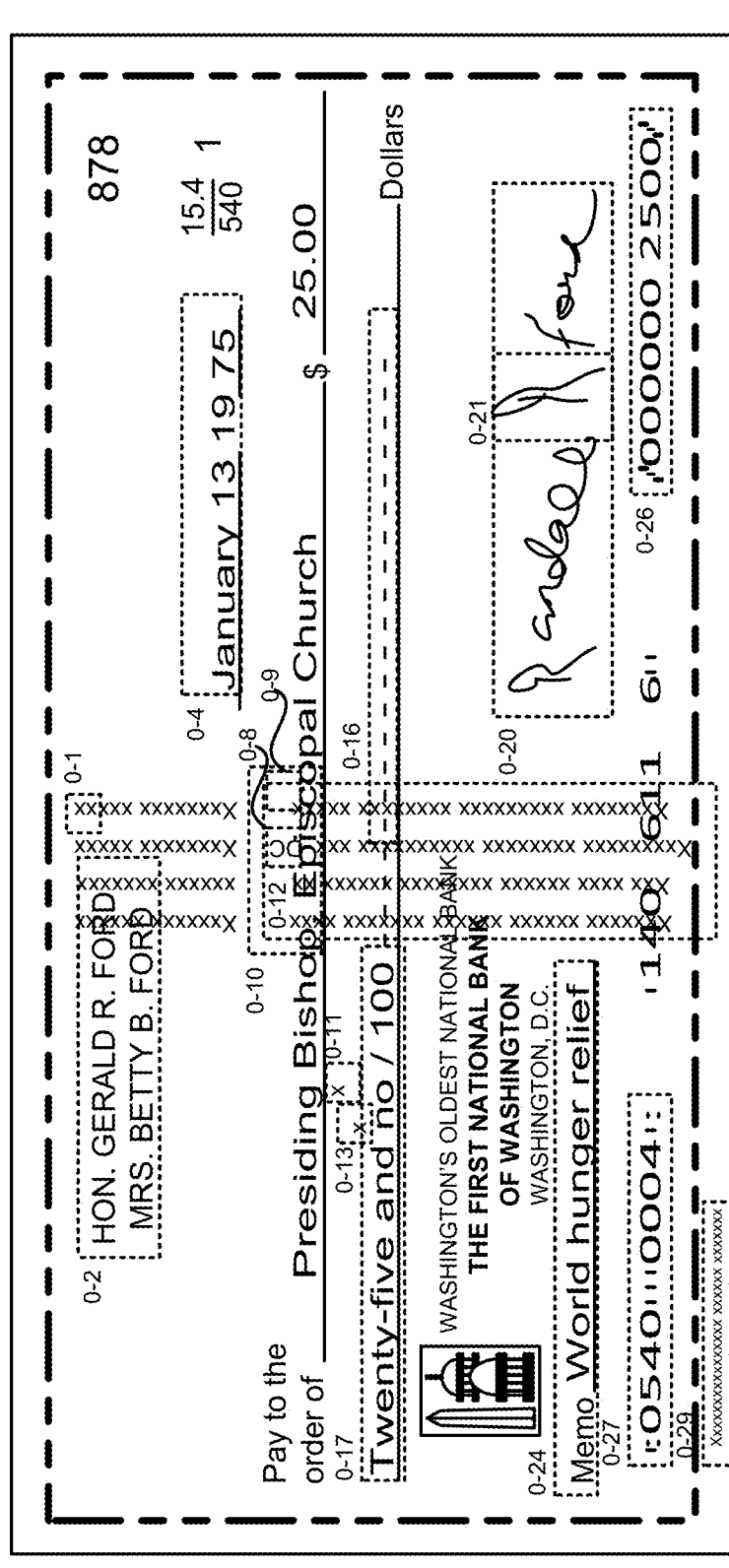
FIG. 3 depicts an indexing operation in accordance with an illustrative embodiment.

Module 1 (Signature detection) of FIG. 2A provides the intermediate output depicted in FIG. 3. Module 1 of FIG. 2A implements an agentic AI architecture, which is depicted in FIG. 4. The description of module 2 depicted in FIG. 2B continues after the description of FIG. 4.

Vision language model (VLM) (204) generates a set of candidate bounding boxes (BB). The candidate BBs are indexed and labeled as described herein (206). The indexed labels are overlaid on check image 202 and provided as input to an agentic AI architecture for detecting a bounding box label that contains the signature (208). The agentic AI architecture localizes the signature field (210). This process is described in more detail elsewhere in this disclosure.

As described earlier, VLMs do not inherently have the capability to comprehend complex queries. So, the first step in the framework according to one embodiment involves the use of an LLM to generate a short text prompt (usually one or two words) from a complex user query. In another embodiment, that step is not needed since it involves the various field detections in checks which are the same or similar in most cases. So, in one embodiment, the input prompt to the VLM is a predetermined text. As a non-limiting example, the predetermined text prompt may be:

Module 1 text prompt: "signature",

Module 2 text prompt: "check fields" for date, courtesy amount, legal amount, magnetic ink character recognition (MICR) line, memo; "texts" for payer name, payee name, bank name.

Without implying any limitation thereto, one example implementation according to the illustrative embodiments chose a pre-trained OWLv2 as the VLM for CFD-Agent due to its versatile capability in zero-shot text-conditioned object detection which includes check field detection without any additional training requirement. The example implementation used the OWLv2 version with ViT-B/16 Transformer architecture on top of the CLIP backbone from the Hugging Face Transformers library.

In one embodiment, the check images were resized and padded to the shape 960×960×3 to fit an input image dimension preference for OWLv2. For detection, the illustrative embodiments used a non-limiting example confidence score threshold in the range 0.001-0.03 which resulted in detecting candidate bounding boxes for all the appropriate check fields. The main criterion for selecting this example threshold was to ensure that important check fields were not missed in the detection process and at the same time the number of candidate detections was not overwhelmingly large (usually it was less than 80). In a typical default configuration, the maximum number of bounding boxes predicted is 3600. A different confidence score threshold and range thereof may be used in certain implementation configurations to change the number of detections, and the same is contemplated within the scope of the illustrative embodiments.

Further, in another embodiment, a non-max suppression was performed for post-processing to eliminate significantly overlapped detections with an Intersection-over-Union Threshold (IoU) specified as 0.4, which usually resulted in detections of candidate boxes in the range of 25-50. A different but comparable threshold may be set for a different range of detection in certain implementation configurations, and the same are contemplated within the scope of the illustrative embodiments.

Furthermore, in another embodiment, additional post-processing steps may be performed, such as for removing exceptionally large candidate bounding boxes (e.g., >25% of the check image area), eliminating candidate bounding boxes with extremely low dimensions (e.g., <12 pixels) or extremely high dimensions (e.g., >30% of the corresponding check image dimension), to eliminate detection of different non-text markings such as lines, or for altering some combination of these and other characteristics or behaviors of the architecture. Example cutoff values, limits, thresholds, constraints, or ranges are used only to describe the effect and effectiveness of those values without implying any limitation thereto. From this disclosure, those of ordinary skill in the art will be able to tune these values for other possible outcomes from alternate implementations, and the same are contemplated within the scope of the illustrative embodiments.

The description of module 2 depicted in FIG. 2B continues after the description of FIGS. 3 and 4.

FIG. 3 depicts an indexing operation in accordance with an illustrative embodiment. Following the candidate bounding boxes detected by the VLM according to schematic 200 of FIG. 2, the bounding boxes are indexed, and the indexes are overlayed on the check images (labeling) according to their corresponding confidence scores, as shown in the example depiction. Even though "signature" is the text prompt for the VLM, the VLM does not necessarily assign the highest confidence score for the candidate bounding box around the signature. This is because OWLv2 was trained on general open-world objects and not for specific tasks such as field detection in bank checks. The overlaid labels are for use by the MMLM to use its general image understanding capabilities and select the label that corresponds to the signature field.

As shown in FIG. 3, one potential effect to this approach is that the labels may be overlapped on top of each other, making it difficult or not feasible for the MLLM to identify the correct label. Thus, in one embodiment, module 1 is configured specifically for signature detection only. Within the scope of the illustrative embodiments, this module can potentially be used for other non-text fields in checks as well, such as the bank logo to identify a financial institution or other non-alphanumeric or graphical content.

FIG. 4 depicts various manifestations of a process implemented as an agentic AI architecture for module 1 in accordance with an illustrative embodiment. Agentic AI architecture (AAA) are depicted as conceptual block diagram 400 and as algorithm 420 which implements conceptual block diagram 400. As one non-limiting example, the detection of the signature in a bank check image can be performed using agentic AI architecture (AAA) 400 in module 1 schematic depicted in FIG. 2A.

AAA 400 includes Actor component 402, Environment component 404, Evaluator component 406, and memory 408. The AAA iteratively refines its selection based on feedback and memory of past errors. This AAA framework is a modification of LLM-based verbal reinforcement learning and adapted for signature field detection in CFD. The main components in the AAA framework are as follows:

Actor 402: A MLLM that receives a check image, candidate bounding boxes with labels, and a memory of past errors. It selects the label most likely to correspond to the target field (e.g., the payer signature).

Environment 404: Visualizes the Actor's selected bounding box on the check image and passes the rendered result to the Evaluator.

Evaluator 406: Another MLLM that verifies whether the selected bounding box correctly identifies the target field. It returns a "Pass" with explanation if correct, or a "Fail" with feedback otherwise. If the grade assigned in "Fail", then the selected candidate bounding box by the Actor is removed from the list of candidate bounding boxes for the next iteration.

Memory 408: A dynamic list of misclassified labels. It evolves with each failed attempt and guides the Actor to avoid previously incorrect choices.

In the algorithm, the variables are:

J: Bank check image (Input image)

n: Total number of candidate bounding boxes after VLM and post-processing $B=[b_1, b_2, \ldots, b_n]$: A list of candidate bounding boxes produced by the upstream vision-language detector.

$L=[l_1, l_2, \ldots, l_n]$: A corresponding list of labels for each bounding box.

M: A memory set that stores prior misclassification labels. Initially the memory set is empty.

t: Iteration step starting with 0.

$T_{max}$: The maximum number of allowable iterations.

$S_t=(J, B_t, L_t, M_t)$: Each state at iteration t.

FIG. 4 depicts the agentic AI algorithm for selecting the correct bounding box from the list of candidates using the MLLM. In one non-limiting example case, the illustrative embodiments used GPT-4 as the MLLM, although the algorithm itself is agnostic to the type of MMLM used and other MLLMs are contemplated within the scope of the illustrative embodiments.

FIG. 2B depicts a schematic of Module 2 (OCR-based check field detection) in accordance with an illustrative embodiment. Check image 202 which was the input to module 1 (200A) also serves as input to module 2 (200B). Module 2 operates in conjunction with module 1 of FIG. 2A as described herein.

A signature field is distinct because there an individual may express their distinct style and may not always be alphanumeric or be accurately readable even if alphanumeric in one or more languages, or may be graphical, stylized, or artistic in nature lending to difficulties in machine identification and understanding. Other graphical fields can suffer from similar issues. Unlike the signature and other graphical or stylized fields, the other check fields are written for the purpose of proper readability. Thus, performing accurate OCR in these fields is generally possible.

Module 2 utilizes Named Entity Recognition (NER) and OCR capabilities of an MLLM in addition to the MLLM's general image understanding capabilities to implement a robust method for check field detection following the candidate bounding boxes predicted by the VLM. The VLM used in module 2 may be the same as VLM 204 used in module 1 (as shown in a non-limiting example manner in module 2 200B) or a different VLM from module 1. Similar to module 1, module 2 begins with a list of candidate bounding boxes. But instead of overlaying labels on the candidates, module 2 stacks the candidate bounding boxes in a preferred direction (214), labels the candidate bounding boxes in a preferred position relative to the bounding boxes, or both. As a non-limiting example, in one example embodiment, module 2 stacks the candidate bounding boxes vertically and indexes them using labels to their left as shown in FIG. 2B. This preference helps avoid the overlap of labels as can happen in module 1.

Following this preference configuration, the MLLM is prompted to perform OCR (216) on the vertically stacked fields along with the associated labels. Additionally, the MLLM is also prompted to perform NER (220) of specific check fields given the original check image which becomes the reference. For each check field, character error rate (CER) (222) is calculated between the reference for that field obtained by the MLLM-based NER and a set of objects in the vertically stacked candidates. In one embodiment, the set of objects includes all the objects in the vertically stacked candidates. Candidates with CER below a specified threshold are input into AAA 228 used in module 2. AAA 208 of module 1 (200A) and AAA 228 of module 2 (200B) may be the implemented as a common component for use by either module, or separately as distinct components for use by their respective modules. AAA 228 produces one or more target localized check fields (230).

FIG. 5 depicts various manifestations of a process implemented as an agentic AI architecture for module 2 in accordance with an illustrative embodiment. Agentic AI architecture (AAA) is depicted as algorithm 500. As one non-limiting example, agentic AI architecture (AAA) 500 can be implemented in module 2 schematic depicted in FIG. 2B.

In AAA 500, the CER is calculated based on the following formula—

$$C=(S+D+I)/N$$

where C is the CER, S is number of character substitution, D is the number of character deletions, I is the number of character insertions, and N is the length of the reference text obtained via NER by MLLM. In one non-limiting implementation, the CER was calculated using the opensource Python library editdistance, which is essentially a fast implementation of the Levenshtein distance. Based on a predefined threshold for CER ($C_0$), candidates from the vertical stack are selected with CER values less than $C_0$. In some experiments using the example implementation, specifying $C_0=0.8$ output desirable results overall. If more than one candidate is selected, then a similar agentic evaluation process is undergone as described for module 1, with the following modifications:

No separate MLLM actor is necessary anymore since the iteration is done over all the candidates that have CER values less than $C_0$.

The set of bounding boxes B and the corresponding labels L do not contain all the candidates following the VLM and post-processing, but only a subset of size m which have CER less than $C_0$.

The memory set is not required any more since no MLLM actor is needed.

In addition to the variables defined for module 1, the following additional variables are used:

$V=[v_1, v_2, \ldots, v_n]$: A list representing the texts from the vertical stack of candidate bounding boxes.

$R=[r_1, r_2, \ldots, r_k]$: A list representing the reference texts from the NER conducted by the MLLM, where k is the total number of check fields of interest. In this case, k=8.

$C=[c_1, c_2, \ldots, c_j]$: A list of CERs between each reference field text $r_j$ and all the texts extracted from the vertical stack of candidate bounding boxes, where $j=0, 1, \ldots, k$.

AAA algorithm 500 for module 2 (AAA 228 in FIG. 2B) is shown in FIG. 5. While stacking the candidates removes the problem of label overlapping, it also eliminates any positional information with respect to the original check image. Thus, the iterative MLLM based evaluation described above in module 2 of FIG. 2B ensures that proper localization of the field of interest is executed. For instance, both the payer name and the signature might have the same CER with respect to the payer name reference, and the MLLM-based evaluation of the location of the candidate bounding box ensures that the correct candidate is selected. If more than one candidate is selected in the evaluation stage above, then the candidate bounding box with the smallest CER is selected. If there are more than one candidate bounding boxes with the smallest CER, then the one with the smallest bounding box area is selected.

The illustrative embodiments recognize that detecting some check fields can be challenging due to variations in the structure of that check field in different check specimen. The MICR line is one non-limiting example of such a challenge due to variations in the MICR line structure across different banks. For instance, some checks have large gaps between components like routing, account, and check numbers, leading the VLM to detect only parts of the line. Additionally, the MLLM's NER is least accurate, or has less than a threshold level of accuracy, for such check fields (e.g., the MICR line), compounding the issue. To tackle this problem, one illustrative embodiment only uses the vertical coordinates of the bounding box for such check fields (e.g., the MICR line) detected by the framework and extend the horizontal coordinates to an end of the check. For example, in the MICR line example, if a check image has the dimension 960×480 (width X height), and the coordinates of the bounding box were detected as [200, 440, 820, 460] (in the form $[x_1, y_1, x_2, y_2]$ where $(x_1, y_1)$ and $(x_2, y_2)$ are the top-left and bottom-right coordinates, respectively), then the final post-processes bounding box coordinates would be specified as [0, 440, 820, 960]. Other check fields where a similar difficulty is encountered, an embodiment can be adapted to make similar adjustments, and the extension of the embodiments to such other check fields with corresponding adjustments is contemplated within the scope of the illustrative embodiments.

The illustrative embodiments also observed reduced OCR accuracy when too many (more than a threshold number) bounding boxes are stacked vertically. To mitigate this, an illustrative embodiment splits the group of bounding boxes into smaller groups of up to a threshold group size (as a non-limiting example, max 7 boxes each). The embodiment processes the groups individually with the MLLM then reassembles the outputs obtained for each group. Although the illustrative embodiments used the MLLM to perform OCR on the vertical stacks of candidate bounding boxes, the framework of an embodiment can be configured to use other OCR models such as, for example, Tesseract and TrOCR, to reduce the overall cost of running the framework.

Experiments were conducted with example non-limiting implementations of one or more embodiments described herein. The details pertaining to these experiments is now disclosed as follows—

Dataset: The CFD-Agent framework of an implementation performed zero-shot detection of check fields using the combined open world object detection capability of VLM and the general image understanding and OCR capability of MLLM. Thus, no training dataset was required for the CFD-Agent. To evaluate the efficacy of the CFD-Agent framework, a dataset comprising 110 bank check images was curated from publicly available sources on the internet due to the lack of publicly available datasets of bank checks for confidentiality and other reasons. The dataset encompassed a diverse range of U.S. check formats, including personal checks, cashier's checks, counterfeit specimens, and images exhibiting varying degrees of noise and degradation. This heterogeneity was deliberately introduced to simulate real-world conditions and ensure robustness across a spectrum of practical scenarios. The inclusion of both genuine and forged checks, along with variations in resolution, lighting, and occlusions, allowed for a comprehensive assessment of the framework's generalizability and resilience in the face of non-ideal inputs commonly encountered in financial document processing. The experiment labelled all the check images with bounding boxes for each of the 9 example check fields selected for the experiment, using the opensource VGG Image Annotator tool for the purpose of the experimentation. The experiment also extracted each selected field for NER evaluation. The experiment used 5 example check images from this dataset to develop the CFD-Agent framework, but none of the images were used to train any trainable parameters of either the VLM or the MLLM.

Evaluation: The evaluation of the CFD-Agent framework falls under two categories: NER evaluation and evaluation of object detection for check fields.

Evaluation of Named Entity Recognition (NER). Module 2 of the CFD-Agent framework depends on accurate NER— (greater than a threshold degree of accuracy in recognition)—to extract the reference for the check fields. To evaluate the NER performance of GPT-4 (a nonlimiting example model selected for module 2 of CFD-Agent), the experiment extracted a set of the fields of interest which were used as ground truths. The CER was calculated between these ground truths and the GPT-4 performed NER, e.g., using the 'editdistance' Python library as described in Section 3.3. Finally, the statistical summary of the CER estimates was generated.

Evaluation of object detection. The final task of the CFD-Agent is to perform object detection on the various check fields. As a non-limiting example, the evaluation used some of the most widely used metrics for object detection, which are based on Intersection-over-Union (IOU) between ground truth bounding boxes and the model predicted bounding boxes. The evaluation used suitable accuracy measure thresholds, such as for example, at 0.25 and 0.5 IOU thresholds.

Some existing object detection evaluation metrics, such as average precision (AP) and mean average precision (mAP), are not applicable for this evaluation of this framework. This is because these metrics require prediction of confidence scores by the object detection model. The design of the CFD-Agent framework (similar to LLM-Optic) does not have a confidence score associated with the final detected objects. Although the VLM predicts bounding boxes with associated confidence scores, the final bounding box selected by the MLLM rarely is the one with the highest confidence score. Thus, these confidence scores are not relevant for estimating mAP. Therefore, the evaluation performed benchmarking tests on the example CFD-Agent framework implementation against LLM-Optic, which for comparison purposes is a general purpose visual grounding model that uses MLLM for object detection without requiring any training or fine-tuning. The metrics used for this benchmarking includes mean intersection over union (mIOU), accuracy at IOU thresholds, e.g., thresholds of 0.25 and 0.5. This evaluation method includes the predictions of both module 1 and 2 of CFD-Agent.

FIG. 6 depicts certain results of the experiment and evaluations conducted with an example implementation of an embodiment. The numerical values described for thresholds, percentages, sizes, count, numerosity, and other purposes are used only as suitable guides and are not intended to be limiting on the illustrative embodiments. From this disclosure, those of ordinary skill in the art will be able to configure other suitable values for comparable purposes in this and other configurations of an embodiment, and the same are contemplated within the scope of the illustrative embodiments.

Result 1: Named Entity Recognition (NER). FIG. 6A depicts table 1 (600) which describes the character error rates (CER) between the MLLM performed NER and manually labelled ground truth for 8 check fields. The CER results revealed several key trends in the performance of GPT-4 as the MLLM in the NER task across the different fields in bank checks. Since CER is an error metric, lower values indicate better performance. Overall, GPT-4 achieved strong accuracy in many fields, with an overall weighted average CER of 0.070 across all the 8 check fields.

The mean CER values demonstrated high accuracy with the mean CER less than 10% for most of the fields except MICR and payer name. However, the high standard deviations observed in the fields payee name (0.450) and payer name (0.435) pointed to a larger deviation from their corresponding mean CER values that dominated the overall error rates. The sample sizes of all the check fields were not the same, which may have had some impact on the relative differences in the CER aggregates. This is because of the wide variety of checks in the dataset with some missing fields. These includes cashier's checks, checks for instructional purposes with some fields removed, checks with illegible handwriting among others. Memo is notable among the other check fields since it is often an optional field and was missing in many of the checks.

Overall, long check fields such as the MICR field and handwritten fields such as names and legal amounts remained the most error-prone. The latter are typically associated with challenging handwriting, rare or foreign names, or poor image quality, which cause NER to fail completely in some samples. Somewhat surprising result was the relatively high CER in the MICR field, with a mean of 0.134 and a median of 0.104. MICR fonts are standardized and machine-readable by design, so performance degradation in this field likely stems from the inherent limitations of the MLLM (GPT-4) is performing OCR in long fields. The limited experiments on various prompting strategies did not result in significant improvements in the NER results for MICR. Better or different prompt engineering could potentially improve this performance. Additionally, a wide-scoped experimentation with different MLLM could potentially result in the selection of the best MLLM for the highest NER accuracy.

The overall performance of the CFD-Agent, specifically module 2 in its framework, is highly dependent on the successful implementation of the NER. As described with respect to FIG. 5, module 2 allows for some inaccuracies in the NER. As long as the CER threshold $C_0$ is high enough to allow for minor errors in the CER, the agentic reasoning feature in module 2 still makes it possible to detect the correct fields as prompted. The illustrative embodiments specified, $C_0=0.75$, which is high enough to incorporate any CER as shown in Table 2 (620) in FIG. 6B. Additionally, since the same MLLM was used in NER as the reference text for each field and to perform OCR on the vertically stacked candidate objects, similar errors would potentially be made in both these tasks resulting in low relative CER between them.

Result 2: Check field detection. The accuracy of the check field detection was estimated using Intersection-over-Union (IOU). FIG. 6C depicts graph 640 which plots the IOU distributions for the nine example target fields (Signature, Date, Courtesy amount, Legal amount, Payer name, Bank name, Memo, MICR, and Payee name). CFD-Agent consistently achieved higher or more stable IOU values across all the fields compared to LLM-Optic. This improvement is particularly noticeable in challenging fields such as "Legal amount," "Payer name," and "MICR," where LLM-Optic's predictions displayed a wide variance and lower median IOU values. In contrast, CFD-Agent's predictions in these categories were both tighter in distribution and exhibited higher medians, indicating more reliable localization. In cases like "Legal amount", "Memo" and "Payee name," LLM-Optic struggled considerably with very low median IOU values against the corresponding ground truths, while CFD-Agent maintained a robust baseline performance.

FIG. 6B depicts table 2 (620) which specifies CFD-Agent's performance in comparison with LLM-Optic in terms of three example object detection metrics. CFD-Agent substantially outperformed LLM-Optic across all evaluation metrics. It achieved an overall mIOU of 0.698 compared to 0.360 for LLM-Optic, indicating significantly better localization quality. Accuracy at IOU thresholds further highlighted this gap: CFD-Agent reached 89.0% at Acc@0.25 and 79.6% at Acc@0.5, while LLM-Optic trailed at 46.2% and 37.4%, respectively. These results confirm that CFD-Agent is both more accurate and more precise, especially excelling at stricter IOU thresholds like Acc@0.5, which demands more precise bounding boxes. This suggests that CFD-Agent is not only able to detect the presence of check fields but also localize them with greater precision demonstrating the effectiveness of AAA-based reasoning in tasks that require both visual understanding and contextual alignment.

In Table 1 (600), the MICR field had the worst accuracy for NER (highest mean CER), but as shown in graph 640 and Table 2 (620), the object detection accuracy is quite high. In fact, the Acc@0.25 was highest for MICR among other check fields. In comparison to LLM-Optic, the variation of the IOU (as shown in graph 640) was also significantly lower. This is because the CER threshold specified in module 2 of CFD-Agent was high enough to tolerate any errors in the OCR of the MICR field. The high interquartile range for IOU of LLM-Optic was due to the MLLM selecting other features such as horizontal lines or other patterns within the check. This is most likely due to the similarities in image encodings of the long sequence of digits in the MICR field and the pixel values of other patterns within the check. The strict requirement of module 2 of CFD-Agent using CER (instead of relying on the MMLM's identification of the correct label as in module 1) for identifying relevant objects (or fields) within the checks ensures accurate localization of the MICR field.

The object detection of the legal amount by CFD-Agent had the least accuracy as shown by the mIOU and Acc@0.5 metrics in Table 2. This is because this field is one of the longest handwritten fields in bank checks. The VLM which predicts the candidate bounding boxes sometimes do not have a bounding box that completely encapsulates the legal amount field. This is evident from the observation that the legal amount localization gets a big lift of ~24 pp from Acc@0.5 to Acc@0.25.

The biggest lift in accuracy of check field detection when compared with LLM-Optic as a baseline was observed for the payee name. Even with the most lenient accuracy metric, Acc@0.25, there was a ~70 pp improvement by CFD-Agent when compared with LLM-Optic. This is primarily due to a lot of overlap of the labels of various candidate bounding boxes predicted by the VLM near the vicinity of the payee name. Module 2 of CFD-Agent significantly mitigates this problem.

Overall, the results underscore a critical insight into the application of VLMs and MLLMs in structured financial documents: general-purpose frameworks like LLM-Optic, while capable in open-domain scenarios, lack the contextual rigor required for precise field localization in bank checks. CFD-Agent's performance highlights the value of incorporating agentic reasoning, where downstream task objectives such as OCR quality and semantic field constraints can dynamically guide localization decisions. Notably, its framework design enables refinement strategies, such as the use of CER-informed filtering, to disambiguate visually similar regions (e.g., in the MICR field) and resolve overlapping candidate predictions (e.g., for the payee name). CFD-Agent's superior performance in stricter metrics like Acc@0.5 also signals its strength in precisely delineating their spatial boundaries which is crucial for various downstream tasks such as check fraud detection and information extraction. Importantly, the observed limitations, such as partial capture of long handwritten fields like the legal amount, suggest that bounding box generation by the VLM still poses a bottleneck and may benefit from improved object detection models specialized in document analysis.

While this experiment demonstrates the efficacy of CFD-Agent using a specific combination of component models: for example, GPT-4 as the MLLM and OWLv2 as the VLM, the framework of the illustrative embodiments itself is modular and not inherently tied to these choices. Other MLLMs and VLMs can be substituted within the agentic loops, potentially offering better or different performance depending on the model characteristics and the nature of the document set. The flexibility of CFD-Agent enables other model composition strategies for document AI in high-stakes, domain-specific settings.

Thus, the illustrative embodiments described an agentic AI framework called CFD-Agent that uses a vision language model and multimodal LLM to perform zero-shot check field detection on non-limiting selection of example nine fields: signature, date, courtesy amount, legal amount, payer name, bank name, memo, MICR, and payee name. CFD-Agent has two modules depending on the field to be detected: module 1 for signature and module 2 for the rest. Both modules use the VLM to predict the initial candidate bounding boxes, followed by a MLLM to identify the correct bounding box for each check field from among the candidate bounding boxes. The performance of the CFD-Agent framework was evaluated using a dataset of 110 check images using character error rates for NER and mean intersection over union, accuracy at 0.25 and 0.5 IOU thresholds for object detection. CFD-Agent was benchmarked against a comparable general purpose object detection algorithm and demonstrated superior performance across all nine check fields on all the metrics. Since CFD-Agent is highly accurate and does not require procuring a large dataset for any training, which is a challenging task due to the highly confidential nature of financial documents and lack of public availability of such datasets, it is well-suited for adaptation and integration into a wide variety of downstream systems involving check fraud detection, automatic reconciliation, and document-based process pipelines.

Figure 7:
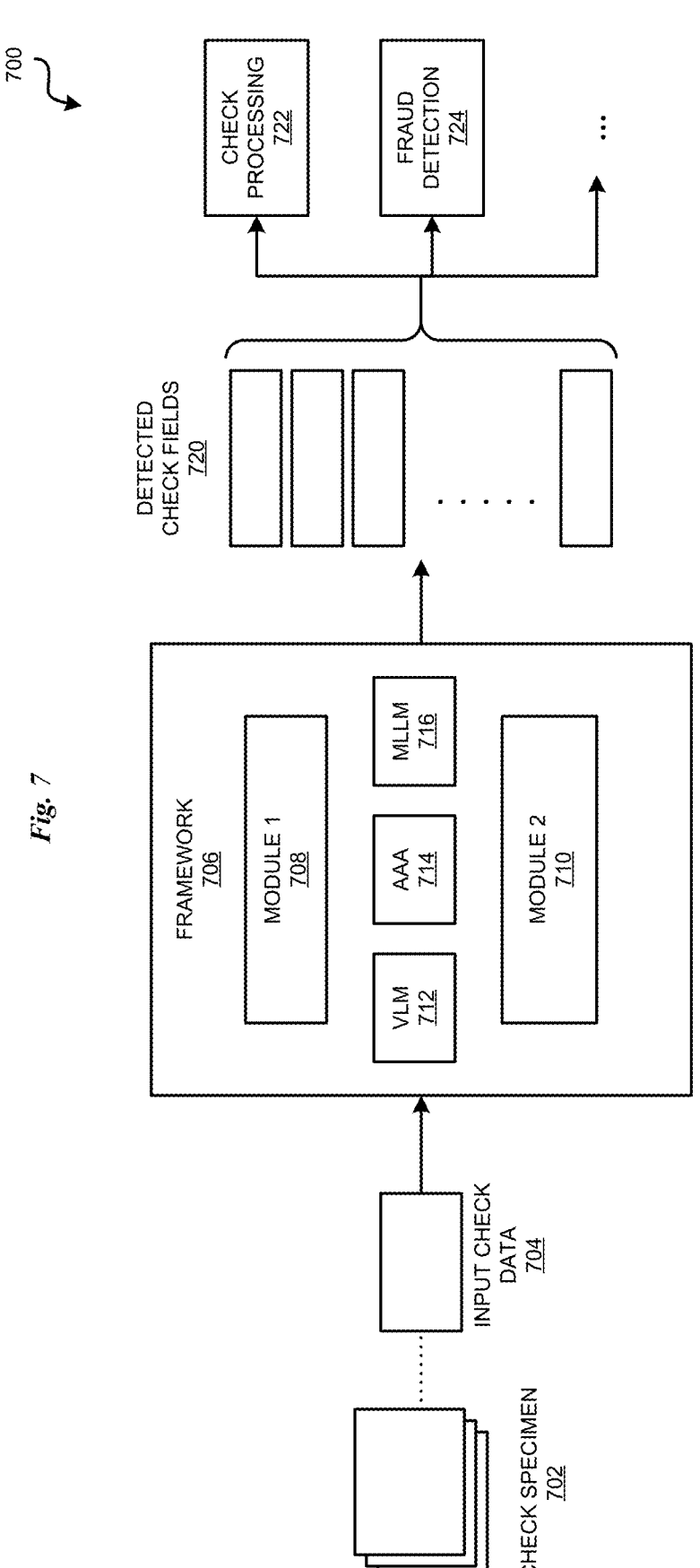
FIG. 7 depicts a block diagram of an overall configuration for training-free framework for zero-shot check field detection in accordance with an illustrative embodiment.

FIG. 7 depicts a block diagram of an overall configuration for training-free framework for zero-shot check field detection in accordance with an illustrative embodiment. Configuration 700 can be implemented and operated in a manner described earlier with respect to FIGS. 2A-5.

Check specimen 702 is a collection of paper checks or a graphical representation thereof. Input check data 704 (e.g., check image 202 in FIGS. 2A-B) is image representation or other facsimile of a check specimen to be processed using configuration 700. Framework 706 is a framework for training-free framework for zero-shot check field detection implementing the schematic of FIG. 2A-B. Module 1 (708) implements the schematic of FIG. 2A. Module 2 (710) implements the schematic of FIG. 2B. modules 1 and 2 (708 and 710) use VLM 712, AAA 714, and MLLM 716 as described herein with respect to the operations of those modules. Framework 706 outputs one or more detected check fields 720. The output of framework 706 serves as input into downstream processing of the check instrument corresponding to input check data 704, such as for check processing 722, fraud detection 724, or other financial data processing functions.

Figure 8:
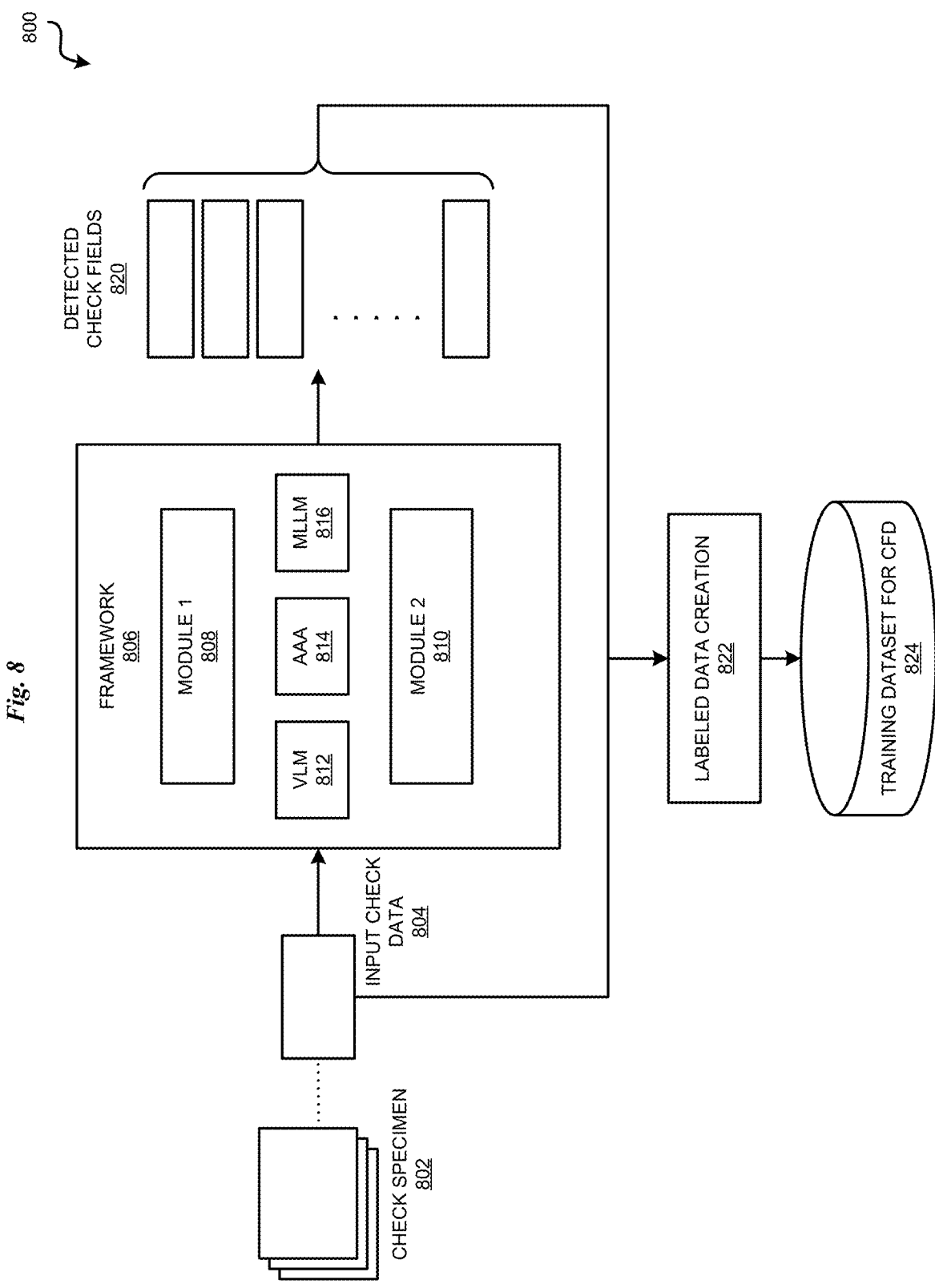
FIG. 8 depicts a block diagram of an overall configuration for generating labeled training data for CFD in accordance with an illustrative embodiment.

FIG. 8 depicts a block diagram of an overall configuration for generating labeled training data for CFD in accordance with an illustrative embodiment. Configuration 800 can be implemented and operated in a manner described earlier with respect to FIGS. 2A-5.

Check specimen 802 is a collection of paper checks or a graphical representation thereof. Input check data 804 (e.g., check image 202 in FIGS. 2A-B) is image representation or other facsimile of a check specimen to be processed using configuration 800. Framework 806 is a framework for training-free framework for zero-shot check field detection implementing the schematic of FIG. 2A-B. Module 1 (808) implements the schematic of FIG. 2A. Module 2 (810) implements the schematic of FIG. 2B. modules 1 and 2 (808 and 810) use VLM 812, AAA 814, and MLLM 816 as described herein with respect to the operations of those modules. Framework 806 outputs one or more detected check fields 820.

Component 822 receives detected check fields 820 and input check data 804 as inputs and produces labeled check data. Component 822 adds the labeled check data into training data set 824 which is usable for training a model in a training-based architecture for CFD.

Figure 9:
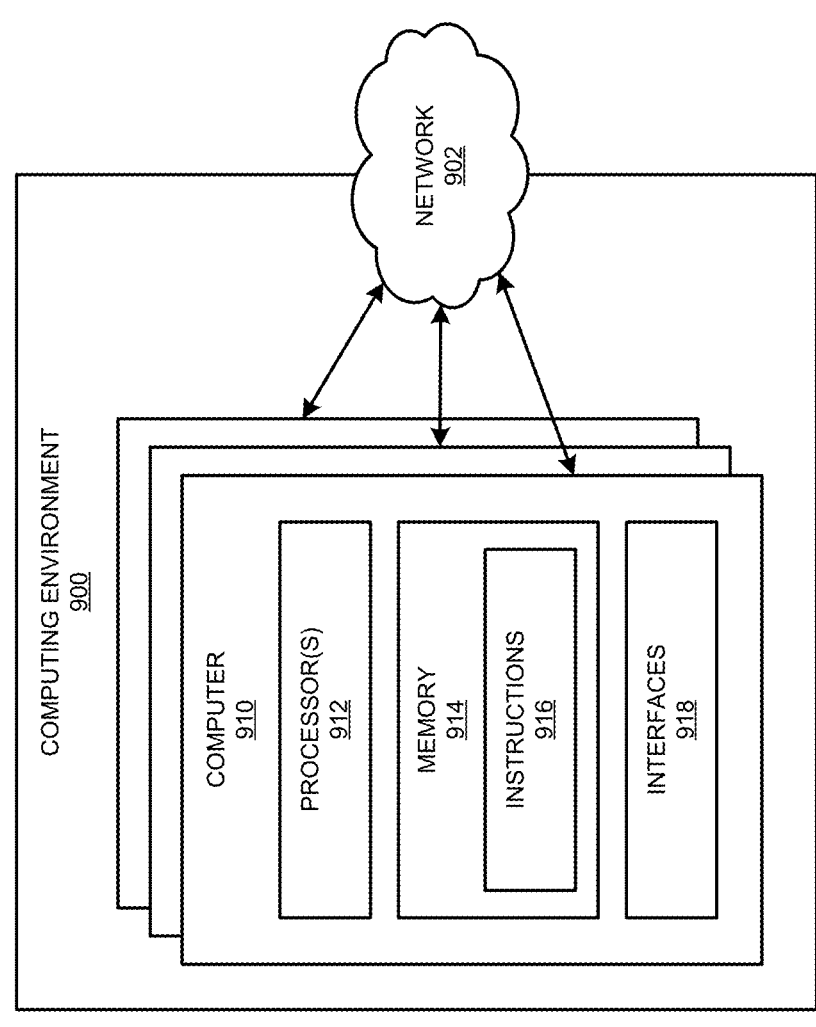
FIG. 9 depicts a data processing environment in which aspects of the present disclosure may be implemented.

FIG. 9 depicts a data processing environment 20 in which aspects of the present disclosure may be implemented. Computing environment 900 is a set of one or more virtual or physical computers 910 that individually or in cooperation achieve tasks, such as implementing one or more aspects described herein. Computers 910 have components that cooperate to cause output based on input. Example computers 910 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 900 includes at least one physical computer.

Computing environment 900 may specifically be used to implement one or more aspects described herein. In some examples, one or more of computers 910 may be implemented as a user device, such as mobile device and others of computers 910 may be used to implement aspects of a machine learning framework useable to train and deploy models exposed to the mobile device or provide other functionality, such as through exposed application programming interfaces.

Computing environment 900 can be arranged in any of a variety of ways. Computers 910 can be local to or remote from other computers 910 of environment 900. Computing environment 900 can include computers 910 arranged according to client-server models, peer-to-peer models, edge computing models, other models, or combinations thereof.

In many examples, computers 910 are communicatively coupled with devices internal or external to computing environment 900 via network 902. Network 902 is a set of devices that facilitate communication from a sender to a destination, such as by implementing communication protocols. Example networks 902 include local area networks, wide area networks, intranets, or the Internet.

In some implementations, computers 910 can be general-purpose computing devices (e.g., consumer computing devices). In some instances, via hardware or software configuration, computers 910 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 910 include one or more processors 912, memory 914, and one or more interfaces 918. Such components can be virtual, physical, or combinations thereof.

The one or more processors 912 are components that execute instructions, such as instructions that obtain data, process the data, and provide output based on the processing. The one or more processors 912 often obtain instructions and data stored in memory 914. The one or more processors 912 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 912 include at least one physical processor implemented as an electrical circuit. Example providers of processors 912 include INTEL, AMD, QUALCOMM, TEXAS INSTRUMENTS, and APPLE.

Memory 914 is a collection of components configured to store instructions 916 and data for later retrieval and use. Instructions 916 can, when executed by the one or more processors 912, cause execution of one or more operations that implement aspects described herein. In many examples, memory 914 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 914 can store information encoded in transient signals.

The one or more interfaces 918 are components that facilitate receiving input from and providing output to something external to computer 910, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 918 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 918 can facilitate connection of computing environment 900 to network 990.

Computers 910 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Figure 10:
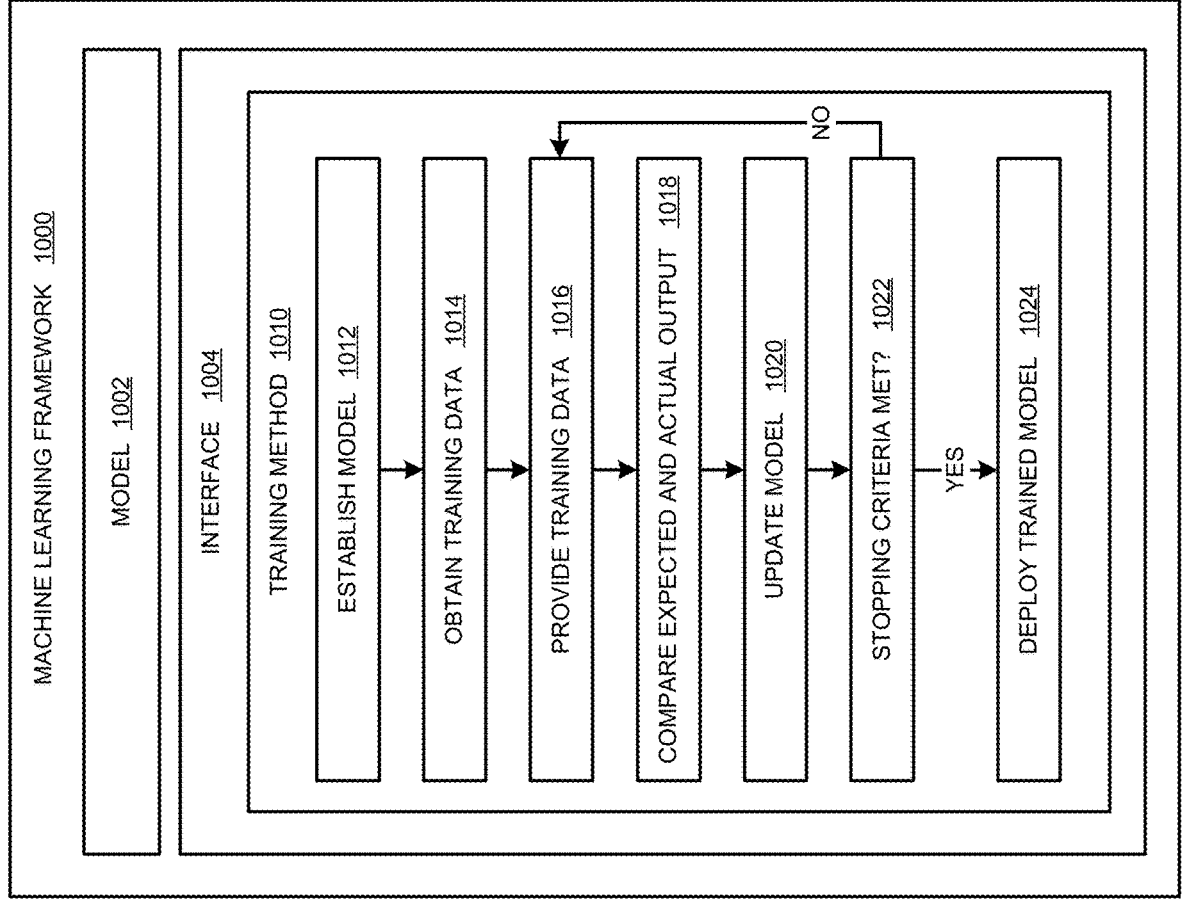
FIG. 10 depicts a configuration for machine learning in which aspects of the present disclosure may be implemented.

FIG. 10 illustrates an example machine learning framework 1000 that techniques described herein may benefit from or improve on. A machine learning framework 1000 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1000 or components thereof are often built or refined from existing frameworks, such as TENSORFLOW by GOOGLE, INC. or PYTORCH by the PYTORCH community.

The machine learning framework 1000 can include one or more models 1002 that are the structured representation of learning and an interface 1004 that supports use of the model 1002.

The model 1002 can take any of a variety of forms. In many examples, the model 1002 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1002 can include a representation of memory (e.g., providing long short-term memory functionality). Where the set includes more than one model 1002, the models 1002 can be linked, cooperate, or compete to provide output.

The interface 1004 can include software procedures (e.g., defined in a library) that facilitate the use of the model 1002, such as by providing a way to establish and interact with the model 1002. For instance, the software procedures can include software for receiving input, preparing input for use (e.g., by performing vector embedding, such as using Word2Vec, BERT, or another technique), processing the input with the model 1002, providing output, training the model 1002, performing inference with the model 1002, fine tuning the model 1002, other procedures, or combinations thereof.

In an example implementation, interface 1004 can be used to facilitate a training method 1010 that can include operation 1012. Operation 1012 includes establishing a model 1002, such as initializing a model 1002. The establishing can include setting up the model 1002 for further use (e.g., by training or fine tuning). The model 1002 can be initialized with values. In examples, the model 1002 can be pretrained. Operation 1014 can follow operation 1012. Operation 1014 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1002. Operation 1016 can follow operation 1014. Operation 1016 includes providing a portion of the training data to the model 1002. This can include providing the training data in a format usable by the model 1002. The framework 1000 (e.g., via the interface 1004) can cause the model 1002 to produce an output based on the input. Operation 1018 can follow operation 1016. Operation 1018 includes comparing the expected output with the actual output. In an example, this can include applying a loss function to determine the difference between expected and actual. This value can be used to determine how training is progressing. Operation 1020 can follow operation 1018. Operation 1020 includes updating the model 1002 based on the result of the comparison. This can take any of a variety of forms depending on the nature of the model 1002. Where the model 1002 includes weights, the weights can be modified to increase the likelihood that the model 1002 will produce correct output given an input. Depending on the model 1002, backpropagation or other techniques can be used to update the model 1002. Operation 1022 can follow operation 1020. Operation 1022 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1014. If the stopping criterion has been satisfied, the flow can move to operation 1022. Operation 1022 includes deploying the trained model 1002 for use in production, such as providing the trained model 1002 with real-world input data and produce output data used in a real-world process. The model 1002 can be stored in memory 914 of at least one computer 910, or distributed across memories of two or more such computers 910 for production of output data (e.g., predictive data).

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:
receiving input data, wherein the input data includes image data;
providing the input data to a first branch comprising a first vision model;
processing the input data with the first branch, wherein the processing includes using the first vision model to identify a first set of fields in the input data using a first set of bounding boxes;
recognizing at least one field in the first set of fields as an identified field;
labeling the recognized at least one field in the first set of fields as a labeled identified field;
providing the input data to a second branch comprising a second vision model and a third model;
processing the input data with the second branch, wherein the processing includes:
using the second vision model to identify a second set of fields in the input data using a second set of bounding boxes;
passing the input data with the second set of bounding boxes to the third model; and
causing the third model to output a set of recognized fields within the bounding boxes of the second set of bounding boxes;
recognizing at least one field in the second set of fields as a target field;
labeling the recognized at least one field in the second set of fields as a labeled target field; and
combining the input data, the labeled identified field, and the labeled target field to form labeled data.

2. The computer implemented method of claim 1, further comprising:
training, using the labeled data, a model, the training configuring the model to detect a set of fields in a set of specimen.

3. The computer implemented method of claim 2, further comprising:
deploying the model as a field detection model.

4. The computer implemented method of claim 3, further comprising:
outputting from the field detection model an identification of a signature field in production data; and
inputting a content of the signature field into a processing system as a part of processing one or more documents.

5. The computer implemented method of claim 4, further comprising:
outputting from the trained field detection model an identification of at least one other field in the production data; and
additionally inputting a content of the at least one other field into the processing system.

6. The computer implemented method of claim 5, wherein the at least one other field is one field selected from the group consisting of (i) a payer field, (ii) a payee field, (iii) a courtesy amount field, and (iv) a legal amount field.

7. The computer implemented method of claim 1,
wherein the target field is a magnetic ink character recognition field; and
wherein the method further comprises extending a bounding box bounding the magnetic ink character recognition field to an edge of the input data.

8. The computer implemented method of claim 1, further comprising:
resizing the input data such that a resized image comprising the input data conforms to a specified minimum dimension; and
padding the input data.

9. The computer implemented method of claim 1, wherein recognizing the identified field and the target field includes using one or more agentic artificial intelligences.

10. The computer implemented method of claim 1, further comprising:
converting using a different model, a complex query about the input data into a short prompt; and
providing the short prompt as an input to the first vision model.

11. A computer-implemented method, comprising:
providing production input data as input into a field detection model, wherein the field detection model was trained by a method comprising:
accessing input data, wherein the input data includes image data;
providing the input data to a first branch comprising a first vision model;
processing the input data with the first branch, wherein the processing includes using the first vision model to identify a first set of fields in the input data using a first set of bounding boxes;
recognizing at least one field in the first set of fields as an identified field;
labeling the recognized at least one field in the first set of fields as a labeled identified field;
providing the input data to a second branch comprising a second vision model and a third model;
processing the input data with the second branch, wherein the processing includes:

using the second vision model to identify a second set of fields in the input data using a second set of bounding boxes;

passing the input data with the second set of bounding boxes to the third model; and causing the third model to output a set of recognized fields within the bounding boxes of the second set of bounding boxes;

recognizing at least one field in the second set of fields as a target field;

labeling the recognized at least one field in the second set of fields as a labeled target field; and combining the input data, the labeled identified field, and the labeled target field to form labeled data.

12. The computer implemented method of claim 11, further comprising:

outputting from the field detection model an identification of a signature field in production input data.

13. The computer implemented method of claim 12, further comprising:

inputting a content of the signature field into a processing system as a part of processing one or more documents.

14. The computer implemented method of claim 11, further comprising:

outputting from the trained field detection model an identification of at least one other field in the production data; and additionally inputting a content of the at least one other field into the processing system.

15. The computer implemented method of claim 14, wherein the at least one other field is one field selected from the group consisting of (i) a payer field, (ii) a payee field, (iii) a courtesy amount field, and (iv) a legal amount field.

16. The computer implemented method of claim 11, wherein the target field is a magnetic ink character recognition field; and wherein the method further comprises extending a bounding box bounding the magnetic ink character recognition field to an edge of the input data.

17. The computer implemented method of claim 11, further comprising:

resizing the input data such that a resized image comprising the input data conforms to a specified minimum dimension; and padding the input data.

18. The computer implemented method of claim 11, wherein recognizing the identified field and the target field includes using one or more agentic artificial intelligences.

19. A computer system comprising a non-transitory computer readable medium having stored thereon code of a field detection model trained by operations comprising:

receiving input data in a first branch comprising a first model, the input data comprising an image of a document, the first model adapted to identify a first set of fields in the input data using a first set of bounding boxes;

labeling, by the first model, the first set of fields to output a labeled first set of fields;

identifying an identified field as a desired type of field using a corresponding bounding box from the first set of bounding boxes;

outputting from the first branch, a localized and labeled identified field;

passing the input data to a second branch comprising a second model and a third model, the second model adapted to identify a second set of fields in the input data using a visualized second set of bounding boxes;

passing the input data with the second set of bounding boxes to the third model executing in the second branch, the third model outputting a set of recognizing field within bounding boxes of the second set of bounding boxes;

identifying at least one recognized field of the second set of fields as a target field;

labeling the target field to output from the second branch a labeled target field;

combining to form labeled data in a training data set, the input data, the labeled identified field, and the labeled target field; and training the model with the training data set.

20. The computer system of claim 19, wherein the computer system is configured to:

provide production input data as input into the field detection model; and receive, as output from the field detection model, an identification of at least one field in the production input data.

* * * * *